US011631265B2

(12) United States Patent
Shu et al.

(10) Patent No.: US 11,631,265 B2
(45) Date of Patent: Apr. 18, 2023

(54) AUTOMATED LEARNING OF DOCUMENT DATA FIELDS

(75) Inventors: Hervé Shu, Caluire et Cuire (FR); Jean-Jacques Bérard, Villeurbanne (FR); Cédric Viste, Ecully (FR); Stéphane Lichtenberger, Tupin et Semons (FR)

(73) Assignee: ESKER, INC., Madison, WI (US)

( * ) Notice: Subject to any disclaimer, the term of this patent is extended or adjusted under 35 U.S.C. 154(b) by 1107 days.

(21) Appl. No.: 13/479,736

(22) Filed: May 24, 2012

(65) Prior Publication Data

US 2013/0318426 A1 Nov. 28, 2013

(51) Int. Cl.

| | |
|---|---|
| *G06V 30/00* | (2022.01) |
| *G06V 30/412* | (2022.01) |
| *G06F 40/174* | (2020.01) |
| *G06V 30/416* | (2022.01) |
| G06F 18/40 | (2023.01) |
| G06F 18/21 | (2023.01) |

(52) U.S. Cl.
CPC .......... *G06V 30/412* (2022.01); *G06F 40/174* (2020.01); *G06V 30/416* (2022.01); *G06F 18/2178* (2023.01); *G06F 18/41* (2023.01)

(58) Field of Classification Search
CPC .... G06F 17/241; G06F 17/243; G06Q 10/107
USPC ........................................................ 715/226
See application file for complete search history.

(56) References Cited

U.S. PATENT DOCUMENTS

| | | | | |
|---|---|---|---|---|
| 5,530,907 | A | * | 6/1996 | Pavey et al. ..................... 710/69 |
| 6,314,415 | B1 | * | 11/2001 | Mukherjee .............. G06F 9/451 |
| | | | | 706/47 |
| 6,400,845 | B1 | * | 6/2002 | Volino ................. G06K 9/2054 |
| | | | | 358/462 |
| 6,950,553 | B1 | * | 9/2005 | Deere ........................... 382/218 |
| 7,149,347 | B1 | | 12/2006 | Wnek |
| 7,725,408 | B2 | | 5/2010 | Lee et al. |
| 7,747,495 | B2 | | 6/2010 | Malaney et al. |
| 8,437,530 | B1 | * | 5/2013 | Mennie .................... G07F 19/20 |
| | | | | 209/534 |
| 2001/0042083 | A1 | * | 11/2001 | Saito .................. G06K 9/00442 |
| | | | | 715/202 |
| 2002/0062342 | A1 | * | 5/2002 | Sidles ........................... 709/203 |
| 2003/0215137 | A1 | * | 11/2003 | Wnek ................ G06K 9/00469 |
| | | | | 382/181 |

(Continued)

*Primary Examiner* — Cesar B Paula
*Assistant Examiner* — David Faber
(74) *Attorney, Agent, or Firm* — Michael Best & Friedrich LLP

(57) ABSTRACT

Methods and systems for transforming at least a portion of a physical document into digital data. One method includes obtaining a first plurality of data items automatically extracted from a first physical document and a validated value for a data field. The method also includes automatically identifying a first linked data item included in the first plurality of data items that is linked to the validated value and setting a physical position included in a rule to the physical position of the first linked data item. In addition, the method includes obtaining a second plurality of data items automatically extracted from a second physical document and automatically identifying a candidate data item included in the second plurality of data items based on the rule. Furthermore, the method includes automatically populating a value for the data field for the second physical document based on the candidate data item.

24 Claims, 40 Drawing Sheets

(56) References Cited

U.S. PATENT DOCUMENTS

| | | | |
|---|---|---|---|
| 2004/0103367 A1* | 5/2004 | Riss | G06K 9/2054 715/223 |
| 2004/0181749 A1* | 9/2004 | Chellapilla | G06F 17/243 715/222 |
| 2005/0289182 A1* | 12/2005 | Pandian | G06K 9/00442 |
| 2006/0007189 A1* | 1/2006 | Gaines | G06F 17/243 345/179 |
| 2006/0242180 A1* | 10/2006 | Graf | G06F 17/30722 |
| 2006/0282442 A1* | 12/2006 | Lennon | G06F 17/30011 |
| 2006/0288268 A1* | 12/2006 | Srinivasan et al. | 715/505 |
| 2007/0009158 A1* | 1/2007 | Geva et al. | 382/209 |
| 2007/0065011 A1* | 3/2007 | Schiehlen | G06K 9/00469 382/181 |
| 2007/0168382 A1* | 7/2007 | Tillberg | G06K 9/00449 |
| 2008/0104497 A1* | 5/2008 | Lumley | G06F 17/218 715/209 |
| 2008/0120257 A1 | 5/2008 | Goyal et al. | |
| 2008/0154854 A1* | 6/2008 | Ritter | G06Q 10/06 |
| 2008/0162456 A1* | 7/2008 | Daga | G06F 17/30675 |
| 2009/0043689 A1* | 2/2009 | Yang | G06Q 20/102 705/38 |
| 2009/0110279 A1 | 4/2009 | Jain et al. | |
| 2009/0175532 A1 | 7/2009 | Zuev et al. | |
| 2010/0169361 A1* | 7/2010 | Chen | G06F 17/30731 707/769 |
| 2011/0010356 A1* | 1/2011 | Berard | G06F 17/30011 707/707 |
| 2011/0091092 A1* | 4/2011 | Nepomniachtchi | G06K 9/3275 382/139 |
| 2011/0137900 A1* | 6/2011 | Chang | G06F 16/353 707/737 |
| 2011/0173222 A1* | 7/2011 | Sayal | G06F 17/30303 707/769 |
| 2011/0196786 A1* | 8/2011 | Lacerte | G06Q 30/04 705/40 |
| 2011/0218990 A1* | 9/2011 | Jordahl | 707/723 |
| 2011/0249905 A1* | 10/2011 | Singh | G06K 9/00449 382/225 |
| 2011/0271173 A1* | 11/2011 | Ait-Mokhtar | G06F 17/243 715/226 |
| 2012/0189999 A1* | 7/2012 | Uthman | G09B 7/02 434/335 |
| 2012/0203676 A1* | 8/2012 | Chou | G06Q 40/02 705/30 |
| 2012/0265759 A1* | 10/2012 | Bergeron | G06Q 10/10 707/740 |
| 2013/0198123 A1* | 8/2013 | Stadermann | G06K 9/00463 706/46 |
| 2014/0029857 A1* | 1/2014 | Kompalli | G06K 9/00483 382/212 |

* cited by examiner

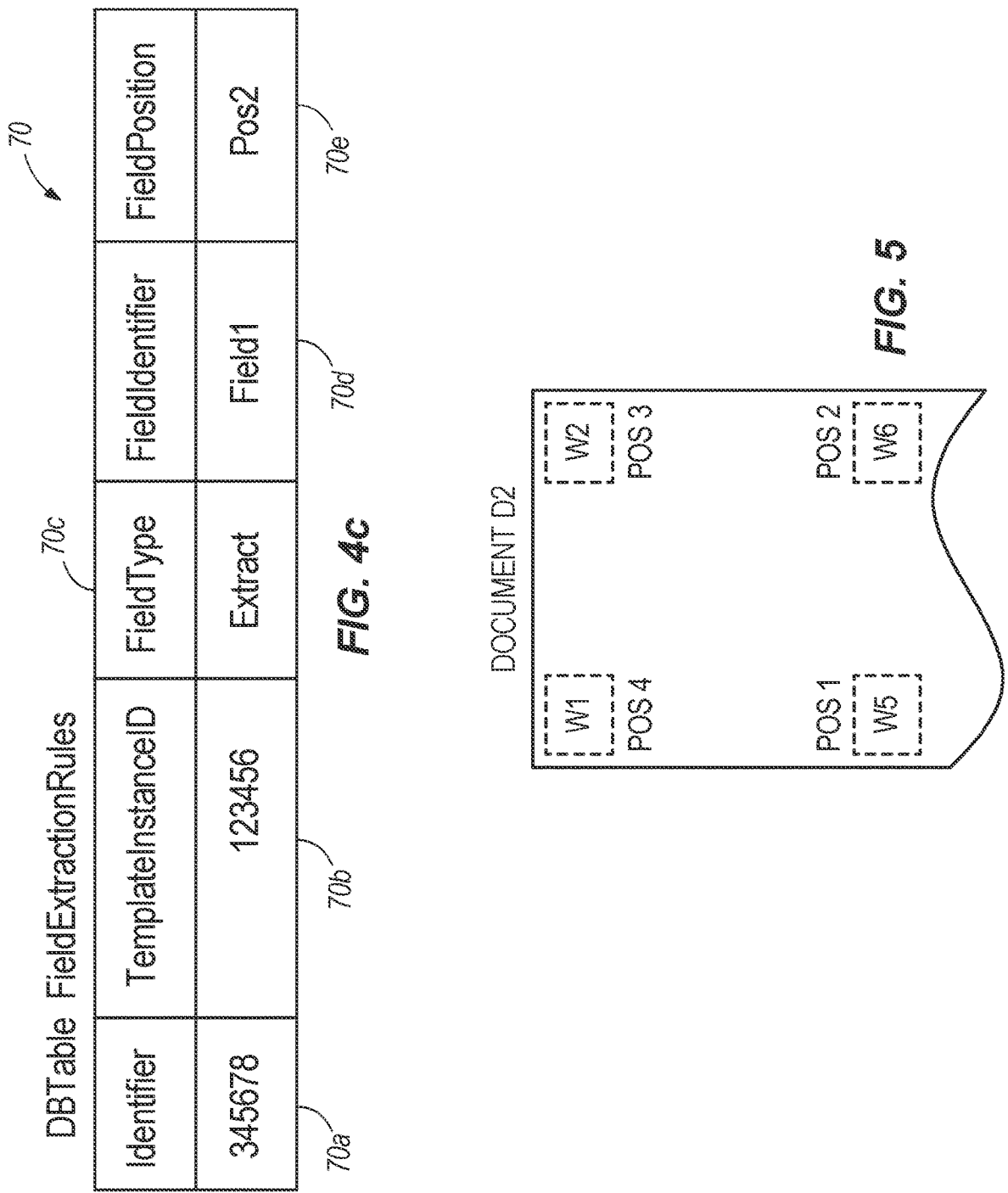

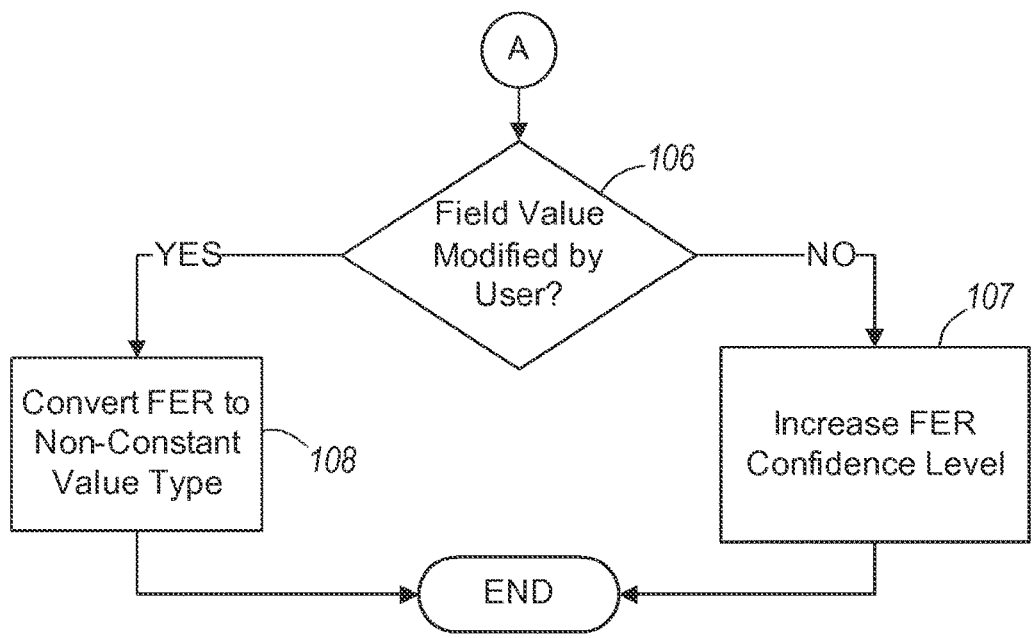
FIG. 6d
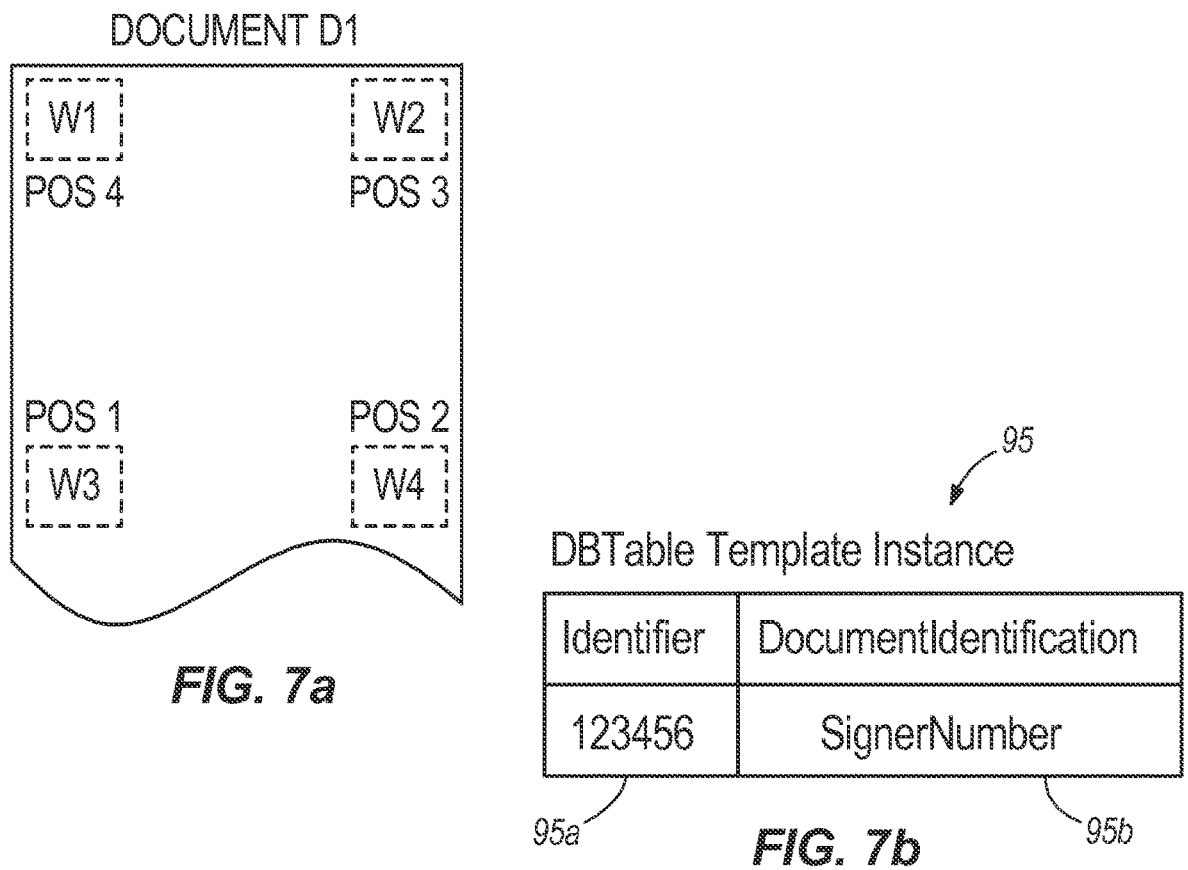
FIG. 7a
FIG. 7b

DBTable FieldExtractionRules /100

| Identifier | TemplateInstanceID | FieldType | FieldIdentifier | FieldValue | FieldPosition |
|---|---|---|---|---|---|
| 345678 | 123456 | Constant | Field1 | V1 | N/A |

DOCUMENT D2

W1 POS 4    W2 POS 3

POS 1 W5    POS 2 W6

*FIG. 8a*

DBTable_SmartFieldData — 110

| Word | FieldIdentifier | TemplateInstanceID | FieldValue | WordConfidence | WordPosition |
|---|---|---|---|---|---|
| W1 | Field1 | 123456 | V1 | -1 | N/A |
| W1 | Field1 | 123456 | V2 | -1 | N/A |
| W2 | Field1 | 123456 | V1 | -1 | N/A |
| W2 | Field1 | 123456 | V2 | -1 | N/A |
| W3 | Field1 | 123456 | V1 | 1 | Pos1 |
| W4 | Field1 | 123456 | V1 | 1 | Pos2 |
| W5 | Field1 | 123456 | V2 | 1 | Pos1 |
| W6 | Field1 | 123456 | V2 | 1 | Pos2 |

*FIG. 8b*

DBTable_FieldExtractionRules — 100

| Identifier | TemplateInstanceID | FieldType | FieldIdentifier | FieldValue | FieldPosition |
|---|---|---|---|---|---|
| 345678 | 123456 | SmartField | Field1 | N/A | Pos1 + Pos2 |

*FIG. 8c*

DBTable_SmartFieldData

| Word | FieldIdentifier | TemplateInstanceID | FieldValue | WordConfidence | WordPosition |
|---|---|---|---|---|---|
| W1 | Field1 | 123456 | V1 | -2 | N/A |
| W1 | Field1 | 123456 | V2 | -2 | N/A |
| W2 | Field1 | 123456 | V1 | -2 | N/A |
| W2 | Field1 | 123456 | V2 | -2 | N/A |
| W3 | Field1 | 123456 | V1 | 1 | Pos1 |
| W4 | Field1 | 123456 | V1 | 1 | Pos2 |
| W5 | Field1 | 123456 | V2 | 1 | Pos1 |
| W6 | Field1 | 123456 | V2 | 1 | Pos2 |
| W7 | Field1 | 123456 | V3 | -1 | Pos1 |
| W8 | Field1 | 123456 | V3 | -1 | Pos2 |
| W1 | Field1 | 123456 | V3 | -1 | N/A |
| W2 | Field1 | 123456 | V3 | -1 | N/A |

FIG. 9b

| ITEM | CONFIDENCE = 100 DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print output, Load bal/LCR. | 2 | 12,540.00 | 25,080.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | CONFIDENCE = 73 e Per Day for Esker Onsite ces | 5 | 500.00 | 2,500.00 |
|  | Total | | | $ |

*FIG. 12*

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print output, Load bal/LCR. | 2 | 12,540.00 | 25,080.00 |
| ESK-EPP-EDP3-25 | 1st Year Esker ClickCare Platform | 1 | 2,508.00 | 2,508.00 |
| ESK-INSTALLDAY | Expenses Estimate per Day for Esker Onsite | 2 | 1,140.00 | 2,280.00 |
| ESK-EDP-T&L | Professional Services | | 500.00 | 2,500.00 |
| | | | Total | $ |

CONFIDENCE = 100
FORMAT = 123,456.7890

CONFIDENCE = 71
FORMAT = 123,456.7890

CONFIDENCE = 66
FORMAT = 123,456.7890

FIG. 13

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., prin... CONFIDENCE = 100 | 2 | 12,540.00 | 25,080.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total $ | |

*FIG. 14*

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web pub, print output, Load bal/LCR. CONFIDENCE = 86 | 2 | 12,540.00 | 25,080.00 |
| ESK-EPP-EDP3-25 | 1st Year Esker Pro Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total $ | |

*FIG. 15*

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print (CONFIDENCE = 75) | 2 | 12,540.00 | 25,080.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total $ | |

*FIG. 16*

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print output, Load bal/LCR. | 2 | 12,540.00 | 25,080.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total | $ |

CONFIDENCE = 100

FIG. 17

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print output, Load bal/LCR. | 2 | 12,540.00 | 25,080.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total | $ |

CONFIDENCE = 90

*FIG. 18*

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print output, Load bal/LCR. | 2 | 12,540.00 | 25,080.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total | $32368.00 |

FIG. 19

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print output, Load bal/LCR. | 1 | 12,540.00 | 12,540.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total | $18,328.00 |

*FIG. 20*

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print output, Load bal/LCR. | 1 | 12,540.00 | 12,540.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total | $18,328.00 |

*FIG. 21*

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print output, Load bal/LCR. | 1 | 12,540.00 | 12,540.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total | $18,328.00 |

*FIG. 22*

| ITEM | DESCRIPTION | QTY | RATE | AMOUNT |
|---|---|---|---|---|
| ESK-EDP3-25 | Esker DeliveryWare Platform Server. Includes 2,500 trans./mo, GDR, TCP/IP, Input Cmd Line Tools, Email Del., Web publ., print output, Load bal/LCR | 1 | 12,540.00 | 12,540.00 |
| ESK-EPP-EDP3-25 | 1st Year Esker Pro: Esker DeliveryWare Platform | 1 | 2,508.00 | 2,508.00 |
| ESK-INSTALLDAY | Esker Onsite Engineering / Install | 2 | 1,140.00 | 2,280.00 |
| ESK-EDP-T&L | Expenses Estimate Per Day for Esker Onsite Professional Services | 5 | 500.00 | 2,500.00 |
| | | | Total | $18,328.00 |

*FIG. 23*

| LINE # | MOD? | ORDER QTY | U/M | VENDOR CATALOG# | DESCRIPTION | | PRICE | EXT. PRICE |
|---|---|---|---|---|---|---|---|---|
| ITEM # | | | | MFG. CATALOG# | GL# | PACKAGING | DISCOUNT | TAX |
| CONTRACT | | | | | | LIST PRICE | EXT. PRICE W/ TAX |
| 1 | | 10 | CS | 4-076887-00 | FILTER EXHALATN 840 VENT DS LF | | $130.24 | $1,302.40 |
| 20846 | | | | 4-076887-00 | 60-101111-100019 | 12 EA / CS | | $0 |
| CE91042-NT1 | | | | | | | | $1,302.40 |

PO SUB TOTAL: $1,302.40  TAX TOTAL: $0  GRAND TOTAL: $1,302.40

| | LINE | VENDOR CATALOG# | QUANTITY | PRICE | EXT. PRICE | MATERIAL ID |
|---|---|---|---|---|---|---|
| ☐ ▶ | 1 | 4-076887-00 | 10.00 | 130.24 | 1,302.40 | 407688700 |

LINE 1 - 1/1  PAGE 1-1

| TEMPLATEINSTANCEID | FIELDNAME | WORD | SMARTFIELDVALUE | CONFIDENCE |
|---|---|---|---|---|
| 172510224 | ZVSR64628 | $0 | 407688700 | 1 |
| 172510224 | ZVSR64628 | $1,302.40 | 407688700 | 1 |
| 172510224 | ZVSR64628 | $130.24 | 407688700 | 1 |
| 172510224 | ZVSR64628 | 1 | 407688700 | 1 |
| 172510224 | ZVSR64628 | 10 | 407688700 | 1 |
| 172510224 | ZVSR64628 | 12 | 407688700 | 1 |
| 172510224 | ZVSR64628 | 20846 | 407688700 | 1 |
| 172510224 | ZVSR64628 | 4-076887-00 | 407688700 | 1 |
| 172510224 | ZVSR64628 | 60-101111-100019 | 407688700 | 1 |
| 172510224 | ZVSR64628 | 840 | 407688700 | 1 |
| 172510224 | ZVSR64628 | CE91042-NT1 | 407688700 | 1 |
| 172510224 | ZVSR64628 | CS | 407688700 | 1 |
| 172510224 | ZVSR64628 | DS | 407688700 | 1 |
| 172510224 | ZVSR64628 | EA | 407688700 | 1 |
| 172510224 | ZVSR64628 | EXHALATN | 407688700 | 1 |
| 172510224 | ZVSR64628 | FILTER | 407688700 | 1 |
| 172510224 | ZVSR64628 | IF | 407688700 | 1 |
| 172510224 | ZVSR64628 | VENT | 407688700 | 1 |

| LINE # / MOD? | ORDER QTY | U/M | VENDOR CATALOG# | DESCRIPTION | | PRICE | | EXT. PRICE |
|---|---|---|---|---|---|---|---|---|
| ITEM # | | | MFG. CATALOG# | GL# | PACKAGING | DISCOUNT | | TAX |
| CONTRACT | | | | | | LIST PRICE | EXT. PRICE W/ TAX | |
| 1 | 14 | CS | 4-076887-00 | FILTER EXHALATN 840 VENT DS LF | | $130.24 | | $1,823.36 |
| 20846 | | | 4-076887-00 | 60-101111-100019 | 12 EA/CS | | | $0 |
| CE91042-NT1 | | | | | | | | $1,823.36 |
| 2 | 2 | BX | MAXFAST | OXISENSOR W/ HEDBD MXFST DSP LF | | $450.00 | | $900.00 |
| 67911 | | | MAXFAST | 60-101111-100019 | 24 EA/BX | | | $0 |

PAGE 1    PRINT DATE: MM/DD/YYYY 3:44PM

| | LINE | VENDOR CATALOG# | QUANTITY | PRICE | EXT. PRICE | MATERIAL ID |
|---|---|---|---|---|---|---|
| ▷ | | | | | | |
| ▷ | 1 | 4-076887-00 | 14.00 | 130.24 | 1,823.36 | 407688700 |
| ▷ | 2 | MAXFAST | 2.00 | 450.00 | 900.00 | |

| | LINE | VENDOR CATALOG# | QUANTITY | PRICE | EXT. PRICE | MATERIAL ID |
|---|---|---|---|---|---|---|
| ▷ | | | | | | |
| ▷ | 1 | 4-076887-00 | 14.00 | 130.24 | 1,823.36 | 407688700 |
| ▷ | 2 | MAXFAST | 2.00 | 450.00 | 900.00 | MAXFAST |

| TEMPLATEINSTANCEID | FIELDNAME | WORD | SMARTFIELDVALUE | CONFIDENCE |
|---|---|---|---|---|
| 172510224 | ZVSR64628 | $0 | 407688700 | 2 |
| 172510224 | ZVSR64628 | $1,302.40 | 407688700 | 0 |
| 172510224 | ZVSR64628 | $1,823.36 | 407688700 | 1 |
| 172510224 | ZVSR64628 | $130.24 | 407688700 | 2 |
| 172510224 | ZVSR64628 | 1 | 407688700 | 2 |
| 172510224 | ZVSR64628 | 10 | 407688700 | 0 |
| 172510224 | ZVSR64628 | 12 | 407688700 | 2 |
| 172510224 | ZVSR64628 | 14 | 407688700 | 1 |
| 172510224 | ZVSR64628 | 20846 | 407688700 | 2 |
| 172510224 | ZVSR64628 | 4-076887-00 | 407688700 | 2 |
| 172510224 | ZVSR64628 | 60-101111-100019 | 407688700 | 2 |
| 172510224 | ZVSR64628 | 840 | 407688700 | 2 |
| 172510224 | ZVSR64628 | CE91042-NT1 | 407688700 | 2 |
| 172510224 | ZVSR64628 | CS | 407688700 | 2 |
| 172510224 | ZVSR64628 | DS | 407688700 | 2 |
| 172510224 | ZVSR64628 | EA | 407688700 | 2 |
| 172510224 | ZVSR64628 | EXHALATN | 407688700 | 2 |
| 172510224 | ZVSR64628 | FILTER | 407688700 | 2 |
| 172510224 | ZVSR64628 | IF | 407688700 | 2 |
| 172510224 | ZVSR64628 | VENT | 407688700 | 2 |

| TEMPLATEINSTANCEID | FIELDNAME | WORD | SMARTFIELDVALUE | CONFIDENCE |
|---|---|---|---|---|
| 172510224 | ZVSR64628 | $0 | MAXFAST | 1 |
| 172510224 | ZVSR64628 | $450.00 | MAXFAST | 1 |
| 172510224 | ZVSR64628 | $900.00 | MAXFAST | 1 |
| 172510224 | ZVSR64628 | 2 | MAXFAST | 1 |
| 172510224 | ZVSR64628 | 24 | MAXFAST | 1 |
| 172510224 | ZVSR64628 | 60-101111-100019 | MAXFAST | 1 |
| 172510224 | ZVSR64628 | 67911 | MAXFAST | 1 |
| 172510224 | ZVSR64628 | BX | MAXFAST | 1 |
| 172510224 | ZVSR64628 | DSP | MAXFAST | 1 |
| 172510224 | ZVSR64628 | EA | MAXFAST | 1 |
| 172510224 | ZVSR64628 | IF | MAXFAST | 1 |
| 172510224 | ZVSR64628 | MAXFAST | MAXFAST | 1 |
| 172510224 | ZVSR64628 | MXFST | MAXFAST | 1 |
| 172510224 | ZVSR64628 | OXISENSOR | MAXFAST | 1 |
| 172510224 | ZVSR64628 | PARTNERSMS0129 | MAXFAST | 1 |
| 172510224 | ZVSR64628 | W/HEDBD | MAXFAST | 1 |

*FIG. 33*

| LINE # / MOD? | ORDER QTY | U/M | VENDOR CATALOG# | DESCRIPTION | | PRICE | | EXT. PRICE |
|---|---|---|---|---|---|---|---|---|
| ITEM # | | | MFG. CATALOG# | GL# | PACKAGING | DISCOUNT | | TAX |
| CONTRACT | | | | | | LIST PRICE | EXT. PRICE W/ TAX | |
| 1 | 4 | BX | MAXFAST | OXISENSOR W/HEDBD MXFST DSP LF | | $450.00 | | $1,800.00 |
| 67911 | | | MAXFAST | 60-101111-100019 | 24 EA / BX | | | $0 |
| PARTNERSMS0129 | | | | | | | | $1,800.00 |
| 2 | 16 | CS | 4-076887-00 | FILTER EXHALATN 840 VENT DS LF | | $130.24 | | $2,083.84 |
| 20846 | | | 4-076887-00 | 60-101111-100019 | 12 EA / CS | | | $0 |
| CE91042-NT1 | | | | | | | | $2,083.84 |

| LINE | VENDOR CATALOG # | QUANTITY | PRICE | EXT. PRICE | MATERIAL ID |
|---|---|---|---|---|---|
| 1 | MAXFAST | 4.00 | 450.00 | 1,800.00 | MAXFAST |
| 2 | 4-076887-00 | 16.00 | 130.24 | 2,083.84 | 407688700 |

LINE 1 - 2/2

*FIG. 35*

AUTOMATED LEARNING OF DOCUMENT DATA FIELDS

FIELD OF THE INVENTION

Embodiments of the invention relate to systems and methods for automatically learning how to populate data fields based on data extracted from a document.

SUMMARY

Businesses spend significant time and resources processing and managing paper documents. To reduce the time and costs associated with paper-based processing, some business use digital-based processing. Digital-based processing creates digital data representing data contained in paper documents. The digital data can be created by a user manually keying data from the paper documents into a data-entry system. To further automate the digitalization of paper documents, document-processing systems were developed that scan paper documents using optical character recognition or other scanning techniques to automatically extract data from the document.

While some document-processing systems are capable of recognizing some extracted data as correlating to a certain data fields, matching extracted data to known categories or fields is still in exact. For example, a user often has to manually enter data that was not recognized by the document-processing system or was not properly matched to the proper data field. In addition, a user may have to manually enter data that, although appears in the processed document, needs to be transformed into a different format. For example, a document may include data of "Jan. 1, 2012" representing a date, but the "order date" data field may require a date in the format "mm/dd/yyyy." In addition, a user may need to manually enter some of the data associated with a particular document that is not specifically included in the processed document. For example, a scanned document may include a product name but not a full product identification number used internally by the business To reduce some of these manual steps, some document-processing systems use templates that are preprogrammed to link data extracted from a document to a particular data field. The templates can also be configured to transform extracted data before using the data to populate a data field (e.g., convert a date into a proper format) and can be configured to use extracted data to generate (e.g., look-up) data for populating data fields that do not directly link to data extracted from a document. However, significant time is required to "teach" the processing system and build such a template. Therefore, before a user can use the document-processing system to perform business-as-usual actions, the system must be taught (through hard-coding and/or repetitive representative use). The investment time associated with "teaching" a document-processing system grows linearly with the number of templates applied by the system. The "teaching" also relies on trained personal, which is costly and can have many negative implications if not performed properly. For example, the document-processing system may not receive sufficient "teaching" time or may receive improper "teaching," which results in a document-processing system with a poor recognition rate. The "teaching" phase must also be repeated anytime the documents being processed change or any time the data fields associated with the documents change, which adds additional recurring costs.

Accordingly, embodiments of the invention provide systems and methods for eliminating the "teaching" phase associated with existing document-processing systems. In particular, embodiments of the invention provide document-processing systems that automatically "learn" based on business-as-usual user interactions with the system links between values for data fields based on extracted data. Over time, the system learns how the value of each data field can be deduced from the data contained in the document. Therefore, the system's recognition rate improves with use and, ultimately, the system eliminates the need for the user to manually enter values into the data fields.

In particular, one embodiment of the invention provides a computer-implemented method for transforming at least a portion of a physical document to digital data. The method includes obtaining, with a processor, a first plurality of data items automatically extracted from a first physical document and a validated value for a data field from a user, wherein the validated value is associated with the first physical document. The method also includes automatically, with the processor, identifying a first linked data item that is linked to the validated value and included in the first plurality of data items and setting a physical position included in a rule defining how to populate a value for the data field to the physical position of the first linked data item within the first physical document. In addition, the method includes obtaining, with the processor, a second plurality of data items automatically extracted from a second physical document and automatically, with the processor, identifying a candidate data item included in the second plurality of data items based on the rule, the candidate data item located at a physical position within the second physical document matching the physical position included in the rule. Furthermore, the method includes automatically, with the processor, populating a value for the data field for the second physical document based on the candidate data item.

Another embodiment of the invention provides a computer-implemented method for transforming at least a portion of a table included in a physical document to digital data. The method includes obtaining, with a processor, a validated value for each of a plurality of data fields from a user, the plurality of data fields representing a table included in a first physical document. The method also includes automatically, with the processor, generating a plurality of extractions from the first physical document for each of the plurality of data fields and assigning each of the plurality of extractions an extraction confidence level based on a degree of match between the extraction and the validated value for the data field, generating a plurality of rows based on the plurality of extractions and assigning a row confidence level to each of the plurality of rows based on the extraction confidence level of each extraction included in the row, and generating a plurality of models based on the plurality of rows and assigning a model confidence level to each of the plurality of models based on the row confidence level of each row included in the model. In addition, the method includes automatically, with the processor, identifying a selected model from the plurality of models, the selected model having a highest model confidence level among the plurality of models and creating a table recognition model based on the selected model, the table recognition model including a landmark of the table representing a starting physical position of the table within the first physical document, one or more columns of the table identified by a physical position within the first physical document and a format, a footer of the table representing an ending physical position of the table within the first physical document, and a confidence level.

Yet another embodiment of the invention provides a computer-implemented method for transforming at least a portion of a physical document to digital data. The method includes obtaining, with a processor, a first plurality of data items automatically extracted from a first physical document and a validated value for a data field from a user, wherein the validated value is associated with the first physical document. The method also includes automatically, with the processor, identifying a first linked data item included in the first plurality of data items, the first linked data item matching the validated value and setting a physical position included in a rule defining how to populate a value for the data field to a physical position of the first linked data item within the first physical document. In addition, the method includes obtaining, with the processor, a second plurality of data items automatically extracted from a second physical document and automatically, with the processor, identifying a candidate data item included in the second plurality of data items, the candidate data item located at a physical position within the second physical document matching the physical position included in the rule. Furthermore, the method includes setting a value for the data field for the second physical document to the candidate data item.

A further embodiment of the invention provides a computer-implemented method for transforming at least a portion of a physical document to digital data. The method includes obtaining, with a processor, a first plurality of data items automatically extracted from a first physical document and a validated value for a data field from a user, wherein the validated value is associated with the first physical document. The method also includes automatically, with the processor, creating a plurality of records, each of the plurality of records including one of the first plurality of data items, a physical position of the one data item within the first physical document, the validated value, and a confidence level. In addition, the method includes automatically, with the processor, identifying a highest confidence record included in the plurality of records, the highest confidence record having a highest confidence level among the plurality of records and setting a physical position included in a rule defining how to populate a value for the data field to a physical position included in the highest confidence record. The method further includes obtaining, with the processor, a second plurality of data items automatically extracted from a second physical document and automatically, with the processor, identifying a candidate data item included in the second plurality of data items, the candidate data item located at a physical position within the second physical document matching the physical position included in the rule. The method also includes automatically, with the processor, identifying at least one matching record included in the plurality of records, the at least one matching record including the candidate data item and setting a value for the data field for the second physical document to a validated value included in the at least one matching record having the highest confidence level.

Still a further embodiment of the invention provides a system for transforming at least a portion of a physical document into digital data. The system includes non-transitory computer-readable media storing instructions and a processor configured to retrieve the instructions from the computer-readable media and execute the instructions to transform a physical document into digital data. The instructions define a capturing module, an automatic learning module, and a user interface module. The capturing module is configured to extract a plurality of data items from a physical document. The automatic learning module is configured to generate a rule defining how to populate a value for a data field associated with a set of physical documents, the rule including a physical position, apply the rule to a first physical document submitted to the system to identify a candidate data item located at the physical position within the first physical document, and populate a value for the data field associated with the first physical document based on the candidate data item. The user interface module is configured to display the value for the data field populated by the automatic learning module to a user and receive a validated value, wherein the validated value includes at least one of (i) the value for the data field populated by the automatic learning module and (ii) a modified value. The automatic learning module is further configured to update the physical position included the rule based on the validated value when the validated value includes a modified value.

Other aspects of the invention will become apparent by consideration of the detailed description and accompanying drawings.

BRIEF DESCRIPTION OF THE DRAWINGS

FIG. 4*c* illustrates a field extraction rule associated with the document of FIG. 4*a*.

FIG. 5 illustrates a second example document processed by the system of FIG. 1 in an extraction mode.

FIGS. 6*b*-6*d* are flow charts illustrating a method performed by the system of FIG. 1 for performing automatic learning during the method of FIG. 3 in a smart mode.

FIG. 7*a* illustrates a first example document processed by the system of FIG. 1 in a smart mode.

FIG. 7*b* illustrates a layout record associated with the document of FIG. 7*a*.

FIG. 7*c* illustrates a field extraction rule associated with the document of FIG. 7*a*.

FIG. 8*a* illustrates a second example document processed by the system of FIG. 1 in a smart mode.

FIG. 8*b* illustrates a tracking table created during the automatic learning process performed as part of processing the document of FIG. 8*a*.

FIG. 8*c* illustrates the field extraction rule of FIG. 7*c* as updated during the automatic learning process performed as part of processing the document of FIG. 8*a*.

FIG. 9b illustrates the tracking table of FIG. 8b as updated during the automatic learning process performed as part of processing the document of FIG. 9a.

FIG. 10b illustrates the tracking table of FIG. 9b as updated during the automatic learning performed as part of processing the document of FIG. 10a.

FIG. 10c illustrates the field extraction rule of FIG. 8c as updated during the automatic learning performed as part of the processing of the document of FIG. 10a.

FIGS. 12 and 13 illustrate potential extractions from an example table determined during the method of FIG. 11.

FIGS. 14-16 illustrate potential rows for the table of FIGS. 12 and 13 determined during the method of FIG. 11.

FIGS. 17 and 18 illustrate potential tables for the table of FIGS. 12 and 13 determined during the method of FIG. 11.

FIG. 19 illustrates components of a potential table used to build a table recognition model for the table of FIGS. 12 and 13 during the method of FIG. 11.

FIGS. 20-23 illustrate table recognition of an example table as performed by the system of FIG. 1 using a table recognition model.

FIG. 25 illustrates a table containing "smartdata" included in a first document processed by the system of FIG. 1.

FIG. 26 illustrates a "smartdata" data field populated by a user for the table of FIG. 25.

FIG. 27 illustrates a tracking table created by the system of FIG. 1 for the "smartdata" data field of FIG. 26.

FIG. 29 illustrates a table containing the "smartdata" included in a second document processed by the system of FIG. 1.

FIGS. 30 and 31 illustrate the "smartdata" data field populated by the system of FIG. 1 for the table of FIG. 29.

FIGS. 32 and 33 illustrate the tracking table of FIG. 27 as updated after processing the table of FIG. 29.

FIG. 34 illustrates a table containing the "smartdata" included in a third document processed by the system of FIG. 1.

FIG. 35 illustrates the "smartdata" data field populated by the system of FIG. 1 for the table of FIG. 34.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention.

Figure 1:
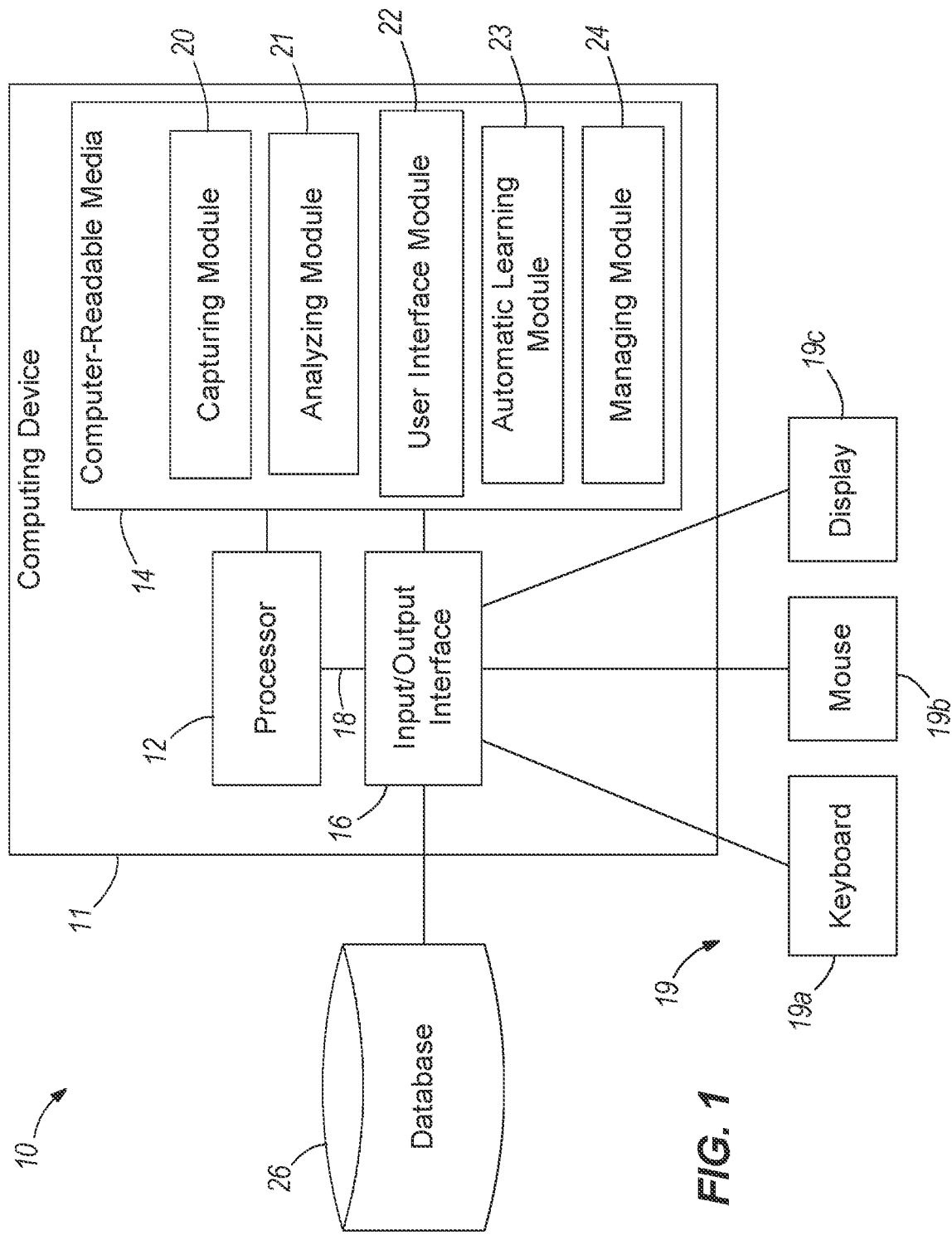
FIG. 1 schematically illustrates a system for processing documents.

FIG. 1 illustrates a system 10 for processing documents. The system 10 includes a computing device 11 that includes a processor 12, computer-readable media 14, and an input/output interface 16. The processor 12, computer-readable media 14, and input/output interface 16 are connected by one or more connections 18, such as a system bus. It should be understood that in some embodiments the computing device 10 includes multiple processors 12, computer-readable media modules 14, and/or input/output interfaces 16.

The processor 12 retrieves and executes instructions stored in the computer-readable media 14. The processor 12 also stores data to the computer-readable media 14. The computer-readable media 14 includes non-transitory computer readable medium and include volatile memory, non-volatile memory, or a combination thereof. The input/output interface 16 receives information from outside the computing device 11 and outputs information outside the computing device 11. For example, the input/output interface 16 includes a network interface, such as an Ethernet card or a wireless network card, that allows the computing device 11 to send and receive information over a network, such as a local area network or the Internet. In some embodiments, the input/output interface 16 also includes drivers configured to receive and send data to and from various peripheral devices 19, such as a keyboard 19a, a mouse 19b, and a display 19c. The input/output interface 16 also stores data received from outside the computing device 11 to the computer-readable media 14 and, similarly, retrieves data from the computer-readable media 14 to output outside the computing device 11.

The instructions stored in the computer-readable media 14 include various components or modules configured to perform particular functionality when executed by the processor 12. For example, as illustrated in FIG. 1, the computer-readable media 14 stores a capturing module 20, an analyzing module 21, a user interface module 22, an automatic learning ("AL") module 23, and a managing module 24. The capturing module 20 is configured to receive inbound documents. The analyzing module 21 is configured to extract data from a document (e.g., using optical character recognition scanning) received by the capturing module 20.

The user interface module 22 is configured to generate a user interface that displays a processed document to a user. In particular, the user interface module 22 displays data extracted by the analyzing module 21 or a portion thereof. The user interface module 22 also displays data fields associated with the document that need to be validated by the user (e.g., using various selection mechanisms, such as buttons). In some embodiments, the user interface module 22 also displays an image of the document being processed or a portion thereof. A user views the user interface on the display 19c and provides input (e.g., by clicking on icons or graphics, clicking on selection mechanisms, such as buttons or drown-down menus, and entering data).

The AL module 23 establishes rules for deducing values for data fields from data extracted from the document based on user business-as-usual interactions with the user interface module 22. The AL module 23 uses the rules to automatically populate values for the data fields for subsequent documents.

The managing module 24 (sometimes referred to as a custom data connector) calls the modules 20, 21, 22, and 23 as needed to process a document. The managing module 24 includes instructions for populating a set of data fields based on a particular document form or layout (e.g., populate a set of data fields representing an order form). In some embodiments, the managing module 24 accesses a table of process records, wherein each process records defines a set of data fields to populate based on a particular document layout. Therefore, the managing module 24 accesses different process records to process different document layouts (based on predetermined configurations or based on user selections).

It should be understood that the functionality of the modules 20, 21, 22, 23, and 24 can be combined and distributed in various configurations. Also, in some embodiments, the modules 20, 21, 22, 23, and 24 access data stored in a database 26 located external to the computing device 11. The computing device 11 connects to the database 26 through the input/output interface 16 over one or more wired or wireless connections or networks. The database 26 store templates, document layouts, and other data used by one or more of the modules or applications stored by the computing device 11 to process a document. For example, in some embodiments, the database 26 stores data (e.g., field extraction rules, tracking tables, table recognition models, etc.) used by the AL module 23 to establish rules for populating a data field based on data extracted from a document. In some arrangements, the database 26 also stores the process records described above with respect to the managing module 24. It should be understood that the data used by the modules 20, 21, 22, 23, and 24 can be stored in the database 26, the computer-readable media 14, or a combination thereof. Also, in some embodiments, multiple databases are used to store data used by the modules.

Figure 2:
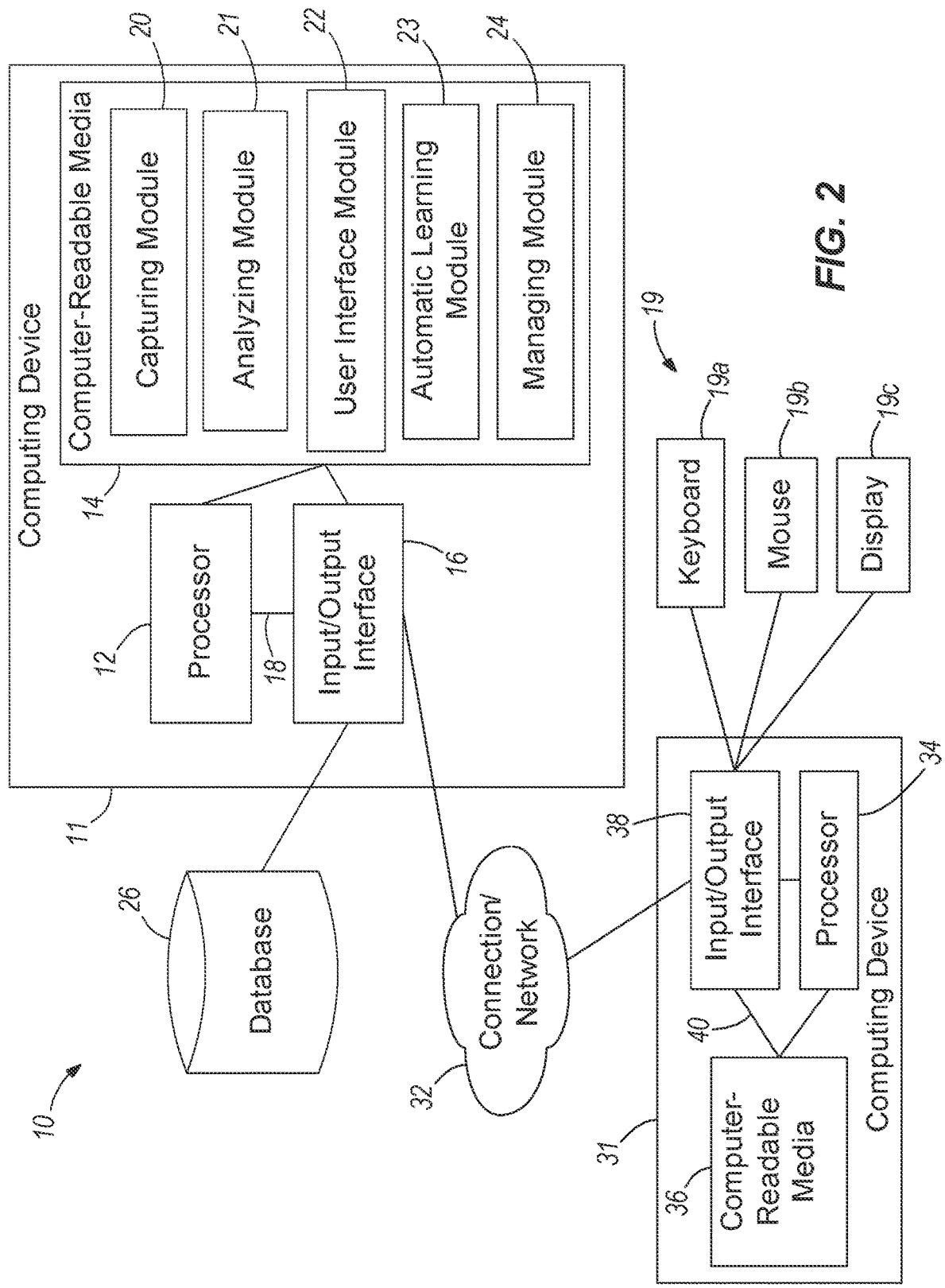
FIG. 2 schematically illustrates the system of FIG. 1 in a hosted environment.

In some embodiments, the computing device 11 is a workstation or a personal computer operated by a user to store and execute the modules 20, 21, 22, 23, and 24 to process a document. However, in other embodiments, the computing device 11 is a server that hosts one or more of the modules 20, 21, 22, 23, and 24. For example, FIG. 2 illustrates the system 10 in a hosted environment. As shown in FIG. 2, the computing device 11 is a server that includes the processor 12, the computer-readable media 14, and the input/output interface 16 connected by the connections 18. However, as shown in FIG. 2, a user operates a second computing device 31 to access and use the modules 20, 21, 22, 23, and 24 stored by the computing device 11 through one or more connections or networks 32, such as the Internet. The second computing device 31 is a workstation or a personal computer that includes a processor 34, computer-readable media 36, and an input/output interface 38 that are connected by connections 40, such as a system bus.

In the embodiment shown in FIG. 2, the second computing device 31 interacts with one or more peripheral devices 19, such as a keyboard 19a, a mouse 19b, and a display 19c. However, the second computing device 31 uses the one or more modules 20, 21, 22, 23, and 24 stored by the computing device 11 as a network-based tool or application. Therefore, a user accesses the modules 20, 21, 22, 23, and 24 stored on the first computing device 11 through the connection or network 32. Accordingly, in some embodiments, a user is not required to have some or any of the modules 20, 21, 22, 23, or 24 permanently installed on their workstation or personal computer. For example, in some embodiments, the user accesses the modules 20, 21, 22, 23, and 24 using a browser application, such as Internet Explorer® or Firefox®. The browser application is stored in the computer-readable medium 36 included in the second computing device 31 and is executed by the processor 34 to connect to the computing device 11 over the Internet. In an alternative arrangement, the computer-readable media 36 also stores data (e.g., a document to be processed), and the modules 20, 21, 22, 23, and 24 executed by the computing device 11 access and retrieve the data from the computer-readable medium 36 over the connection or network 32. It should be understood that the modules 20, 21, 22, 23, and 24 can be distributed between the computing devices 11 and 31 in various combinations.

The system 10 processes documents to generate digital data based on data extracted from the documents. As described above in the summary section, to recognize and extract data from documents and map extracted data to particular data fields, existing document-processing systems require extensive "teaching" methods, which are laborious to implement and difficult to adapt to unplanned situations or changes. To overcome these problems, the system 10 automatically "learns" how to deduce values for data fields based on data extracted from a document. In particular, the system 10 automatically analyzes and tracks the values of data fields validated by a user during business-as-usual interactions with the system 10, generates rules that link data field values to extracted data based on the user interactions, and applies the rules to automatically generate values for the data fields for subsequent documents processed by the system 10. In addition, the system 10 continues to improve the rules by tracking the correctness of the rules and modifying the rules accordingly.

Therefore, unlike existing document-processing system, the system 10 does not require a complete template that maps data extracted from a document to particular data fields. Rather, the system 10 automatically builds on initial basic information identifying a set of data fields to be populated for a particular document and, optionally, the formats and value types associated with each data field (e.g., text, numeric, date, etc.). Accordingly, the recognition rate of the system 10 is based on the number of documents processed, and each document processed by the system 10 that is validated by a user during business-as-usual interactions with the system 10 contributes to the growth of the recognition rate. Therefore, over time, the system 10 requires less human intervention by the user. As used in the present application, "business-as-usual" interactions with the system include actions by a user performed as part of their regular responsibilities as compared to actions taken to process sample documents or configure the system 10 before it is used during normal business operations.

Figure 3:
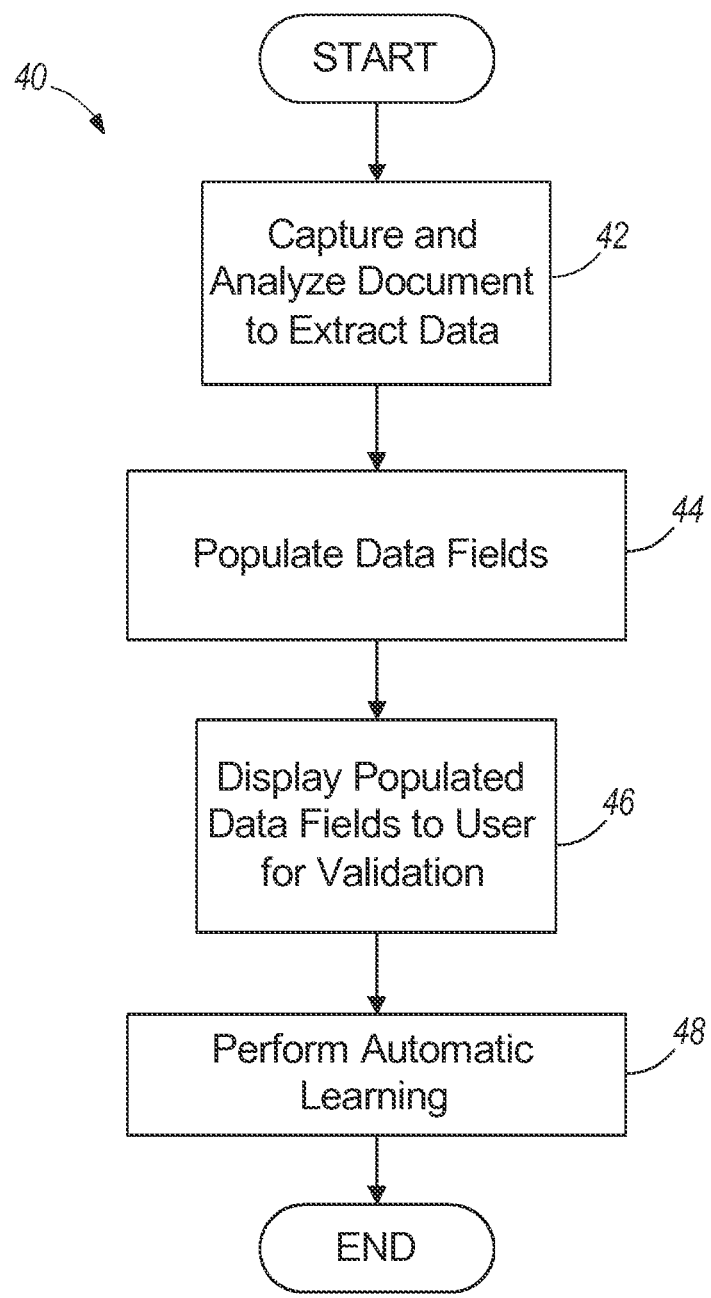
FIG. 3 is a flow chart illustrating a method performed by the system of FIG. 1 for processing a document.

FIG. 3 illustrates a method 40 performed by the system 10 for processing documents. As shown in FIG. 3, the method 40 generally includes four phases. In a first phase, an inbound document is captured and analyzed to extract data from the document (at 42). In a second phase, the data fields associated with the inbound document are populated by the system 10 (or attempted to be populated) (at 44). In a third phase, the populated data fields are displayed to a user for validation as part of business-as-usual interactions with the system (at 46). The fourth phase includes an automatic learning phase, where the system 10 uses the user validations to build and improve rules for deducing values for the data fields for subsequent documents (at 48).

The method 40 can be applied to various types of documents to populate various sets of data fields. For example, in some embodiments, the method 40 is applied to populate data fields with constant values. The method 40 can also be applied to populate data fields with data directly extracted from a document (hereinafter referred to "directly-linked" data). Furthermore, the method 40 can be applied to populate data fields with data based on data extracted from a document (hereinafter referred to as "indirectly-linked" or "smart" data). In addition, the method 40 can be applied to populate data fields representing a table included in a document. Each of these situations will be explained in greater detail below. However, it should be understood that in all of these situations, although the rules generated by the system 10 for deducing data field values may differ, the phases illustrated in FIG. 3 still generally apply.

To aid the understanding of the method 40, the method 40 is described in terms of example documents. It should be understood, however, that the method 40 can be used to process documents other than those used in the examples. Therefore, the details of the example documents used through the following descriptions should not be considered as limiting the applicability of the method 40 to any particular type of document or data fields.

I. Global Data a. Directly-Linked Data (Extraction Mode)

As noted above, the method 40 can be used to populate data fields with constant values or values that are directly-linked to data extracted from a processed document. This functionality will be described in the context of a set of example documents submitted to the system 10 for processing. For this example set of document, the system 10 processes each document to populate a single data field for each document. The data field stores a text-string representing the name of an individual signing each document. Therefore, through the following examples, the data field is referred to as the document-signature data field or "Field1."

Also, in some embodiments, each data field populated by the system 10 is marked as either an "autolearnable" field or a "non-autolearnable" field. An "autolearnable" field includes a data field that the system 10 automatically "learns" how to populate as compared to a "non-autolearnable" data field that the system 10 is pre-programmed (i.e., taught) to know how to populate. For example, in the documents D1, D2, D3, and D4, the word at position 2 is the name of the individual signing the document. The system 10 is either pre-programmed with this information or automatically "learns" this information by tracking a user's business-as-usual interactions with the system 10. For the purposes of the following example, the document-signature data field is marked as an "autolearnable" field, and the system 10 is not initially taught or pre-programmed to know the link between position 2 in the document and the document-signature data field. Rather, as described in detail below, the system 10 automatically "learns" this link over time based on the user's business-as-usual interactions with the system 10.

i. Document D1

Figure 4A:
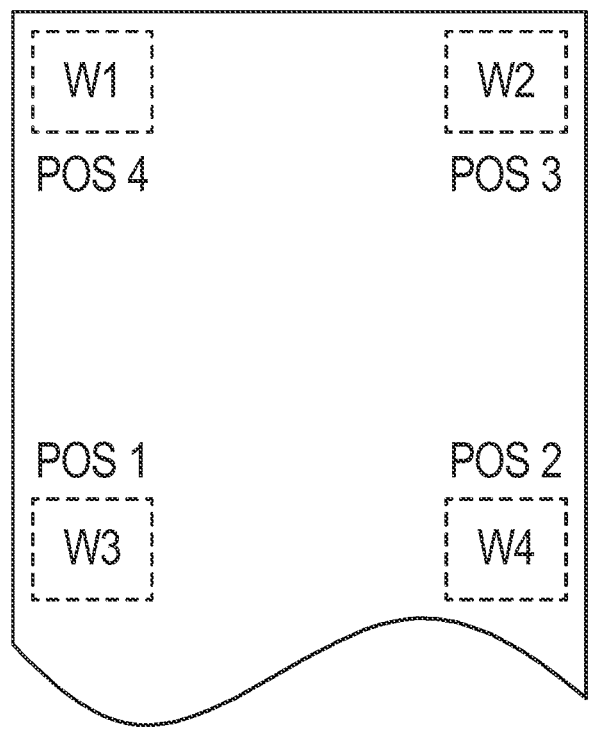
FIG. 4*a* illustrates a first example document processed by the system of FIG. 1 in an extraction mode.

FIG. 4a illustrates an example first or initial document D1 submitted to the system 10 for processing. The document D1 includes four pieces of data (e.g., words) W1, W2, W3, and W4. Word W3 is located at position 1 ("Pos1"), word W4 is located at position 2 ("Pos2"), word W2 is located at position 3 ("Pos3"), and word W1 is located at position 4 ("Pos4"). In some embodiments, the positions of the words are represented as coordinates in an image of the document D1.

Returning to FIG. 3, during the first phase, the document D1 is submitted to the system 10, and the managing module 24 calls the capturing module 20 and the analyzing module 21 to scan the document D1 and extract the words W1, W2, W3, and W4 (at 42). As part of this process, the document D1 is classified as associated with a particular template. The documents associated with the same template generally have the same characteristics, and data contained in these documents are generally recognized and extracted by the field extraction rules ("FERs") (described in more detail below). The template defines how and where to extract data from a submitted document and is applied by the capturing module 20 and the analyzing module 21.

After the words are extracted, the system 10 populates (or attempts to populate) the document-signature data field based on the extracted data (at 44). In some embodiments, during the second phase, the managing module 24 determines (e.g., based on a specific process record) if the set of data fields to be populated for the submitted document includes any "autolearnable" data fields. The managing module 24 populates any "non-autolearnable" data fields and calls the AL module 23 to populate any "autolearnable" data fields. Therefore, because the document-signature data field is marked as an "autolearnable" data field, the managing module 24 calls the AL module 23 to populate this data field.

Figure 3A:
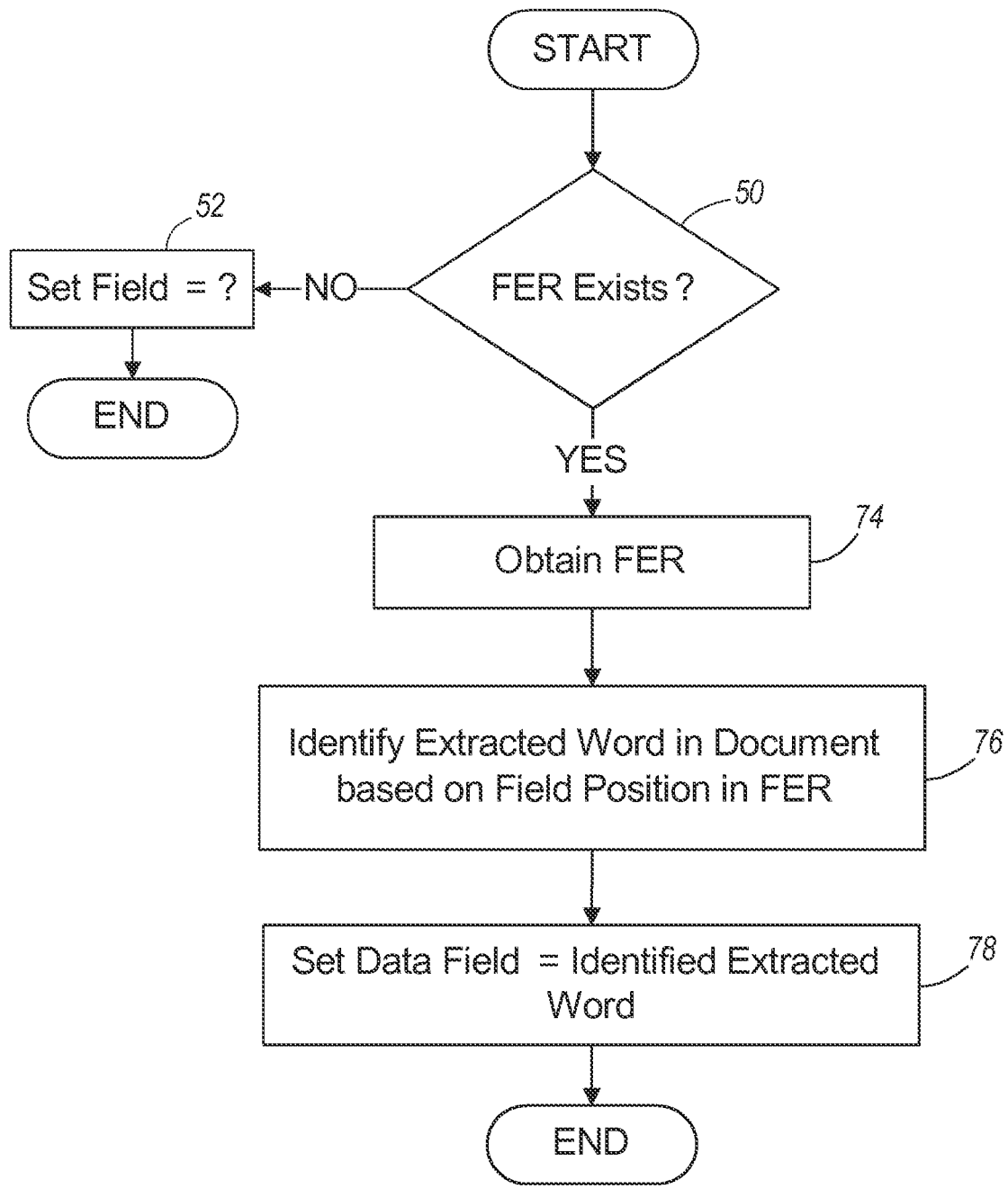
FIG. 3*a* is a flow chart illustrating a method performed by the system of FIG. 1 for capturing and analyzing a document during the method of FIG. 3 in an extraction mode.

FIG. 3a illustrates the actions taken by the AL module 23 to populate an "autolearnable" data field in an extraction mode (i.e., when the data field is populated with data extracted from the processed document). As shown in FIG. 3a, the AL module 23 first determines if a FER exists for the template used to extract the words from the document (at 50). For each template, the system 10 builds a FER for each "autolearnable" data field. The FER defines how to populate an "autolearnable" data field. For example, the FER links a value of a data field to a particular constant or to particular data extracted from the document (e.g., a particular position in a document).

Figure 4B:
FIG. 4*b* illustrates a layout record associated with the document of FIG. 4*a*.

In some embodiments, the system 10 is initially set up without FERs, and the AL module 23 creates the FERs for a template the first time it encounters the template. Therefore, the AL module 23 determines if any FERs exist by determining if it has seen the template classified with the submitted document. For example, assuming that document D1 is the first document processed by the system 10 for a particular process, no FER exists. Therefore, in this situation, no FERs exist that define how to populate the document-signature data field. Accordingly, as illustrated in FIG. 3a, the AL module 23 sets the value of the document-signature data field to null, "?," or a similar value indicating that no value can be determined (at 52). The AL module 23 also keeps track of encountered templates, which the AL module 23 uses to determine whether FERs exist for a particular document. For example, the AL module 23 can maintain a template table 55 as illustrated in FIG. 4b to keep track of encountered templates. The template table 55 includes records of encountered templates and each encountered template is identified by a template identifier 55a (i.e., "123456") and a document identifier 55b (i.e., "DocumentSignature").

Returning to FIG. 3a, after the AL module 23 populates the document-signature data field (at 52), the process returns to FIG. 3 where the populated data field is displayed to the user for validation (at 46). In particular, the user interface module 22 displays data fields populated by the system 10 to a user for validation. As noted above, in some embodiments, the user interface module 22 also displays an image of the document that the user uses to validate the data field values. Returning to the example document D1, because the AL module 23 sets the document-signature data field to null (i.e., because no FER exists), the user validates this data field by entering a value (e.g., using the image of the document D1 as a reference). For example, the user enters W4 for the document-signature data field for document D1. After entering the word W4, the user selects an "approve" selection mechanism to save and submit the validated data field for additional processing by other business processes (e.g., order processing, billing, accounts receivable, etc.).

Figure 3B:
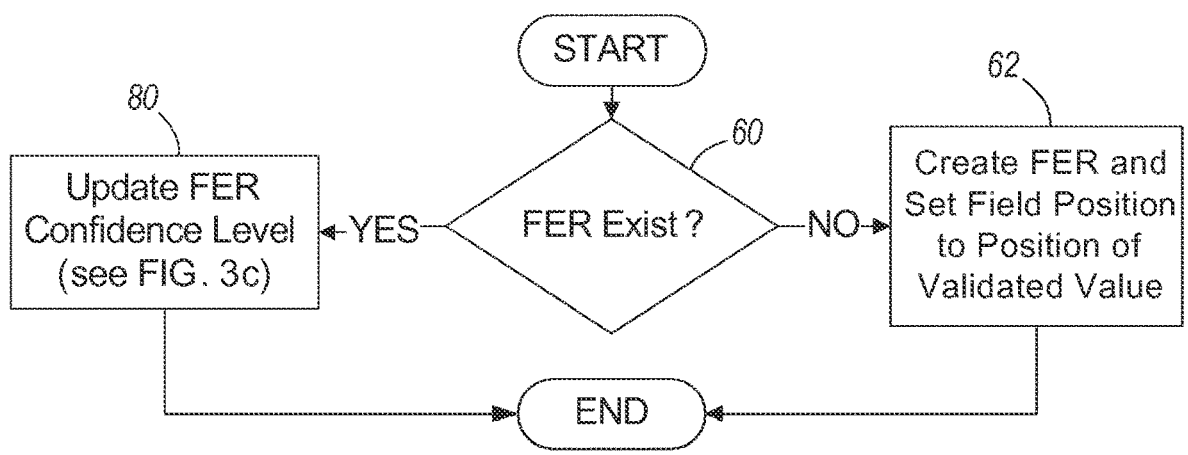
FIGS. 3*b*-3*c* are flow charts illustrating a method performed by the system of FIG. 1 for performing automatic learning during the method of FIG. 3 in an extraction mode.

As shown in FIG. 3, after the user validates the data fields, the AL module 23 performs automatic learning (at 48). During automatic learning, the AL module 23 uses the user's validation of the data fields to establish or improve an FER for each data field. In particular, FIG. 3*b* illustrates actions taken by the AL module 23 to perform automatic learning. To start the automatic learning process, the AL module 23 determines if a FER exists for a particular data field (at 60). As noted above, the FERs are included in the template associated with the processed document and initially a template may not be associated with any FERs. Therefore, for the example document D1, the template (i.e., template "123456") does not yet include any FERs. Accordingly, when no FER exists for a data field (at 60), the AL module 23 creates an FER for the data field (at 62). For example, FIG. 4*c* illustrates an example FER 70 created for the document-signature data field. The FER 70 includes a rule identifier 70*a*, a template instance identifier 70*b*, a field type 70*c*, a field identifier 70*d*, and a field position 70*e*. For the FER 70 associated with the document-signature data field, the AL module 23 sets the rule identifier 70*a* to a unique number (e.g., "345678") associated with the FER 70, sets the field identifier 70*d* to an identifier associated with the document-signature data field (e.g., "Field1"), and sets the template instance identifier 70*b* to the identifier of the template to which the FER 70 is associated with (i.e., "123456"). In addition, as illustrated in FIG. 4*c*, AL module 23 sets the field position 70*e* to the position of the value validated by the user for the data-signature data field for document D1. In particular, the user entered the value or word W4 for the data-signature data field for the document D1. Therefore, the AL module 23 determines the position of this validated word W4 in the document D1. The word W4 is located at position 2 in document D1. Accordingly, the AL module 23 sets the field position 70*e* to position 2 (i.e., "Pos2").

In certain embodiments, each FER is also associated with a confidence level that tracks the recognition rate of the FER. A low confidence level is associated with a low recognition rate and a high confidence level is associated with a high confidence level. Therefore, a confidence level of an FER is increased when the FER properly populates a data field. The confidence level is decreased when the FER improperly populates a data field. As described below, a FER may be discarded if its confidence level gets too low. Initially, when an FER is created, the confidence level is set to a predetermined value, such as 10.

As shown in FIG. 3*b*, after creating a FER (at 62), the automatic learning process is complete, and the system 10 waits for a subsequent document.

ii. Document D2

FIG. 5 illustrates an example of a second document D2 processed by the system 10. The document D2 has a similar layout as document D1 and includes four pieces of data (e.g., words) W1, W2, W5, and W6. Word W5 is located at position 1, word W6 is located at position 2, word W2 is located at position 3, and word W1 is located at position 4.

As described above for document D1, the submitted document D2 is scanned to extract the words (at 42). The managing module 24 then calls the AL module 23 to populate the document-signature data field as illustrated in FIG. 3*a*. As shown in FIG. 3*a*, the AL module 23 determines if an FER exists for the data field (at 50). If a FER exists, the AL module 23 obtains the FER (at 74) and uses the FER to populate the document-signature data field associated with the document D2. In particular, as illustrated in FIG. 3*a*, the AL module 23 identifies an extracted word in the document D2 based on the field position of the FER (at 76). As illustrated in FIG. 4*c*, the FER 70 includes position 2 in the field position 70*e*. Therefore, the AL module 23 determines what extracted word is located at position 2 in document D2. As illustrated in FIG. 5, the document D2 includes word W6 at position 2. Accordingly, the AL module 23 populates the document-signature data field for the document D2 with the word W6 (at 78).

Returning to FIG. 3, after the AL module 23 populates the data fields, the user interface module 22 displays the populated data fields to a user for validation (at 46). As described above, the word at position 2 in each document submitted to the system 10 is the name of the individual signing the document, and word W6 is at position 2 in document D2. Therefore, the value populated by the AL module 23 for the document-signature data field associated with document D2 was correct. Accordingly, the user validates the data field leaving the data field unchanged and selecting an "approve" selection mechanism displayed by the user interface module 22 to save and submit the validated data field for further processing.

After user validation, the AL module 23 performs automatic learning to establish or improve an FER for each validated data field (at 48). As illustrated in FIG. 3*b*, during automatic learning, the AL module 23 determines if a FER exists for each data field (at 60). As described above, if a FER does not exist for a particular data field, the AL module 23 creates a FER for the data field (at 62). Alternatively, if an FER exists, the AL module 23 updates the FER confidence level (at 80).

Figure 3C:
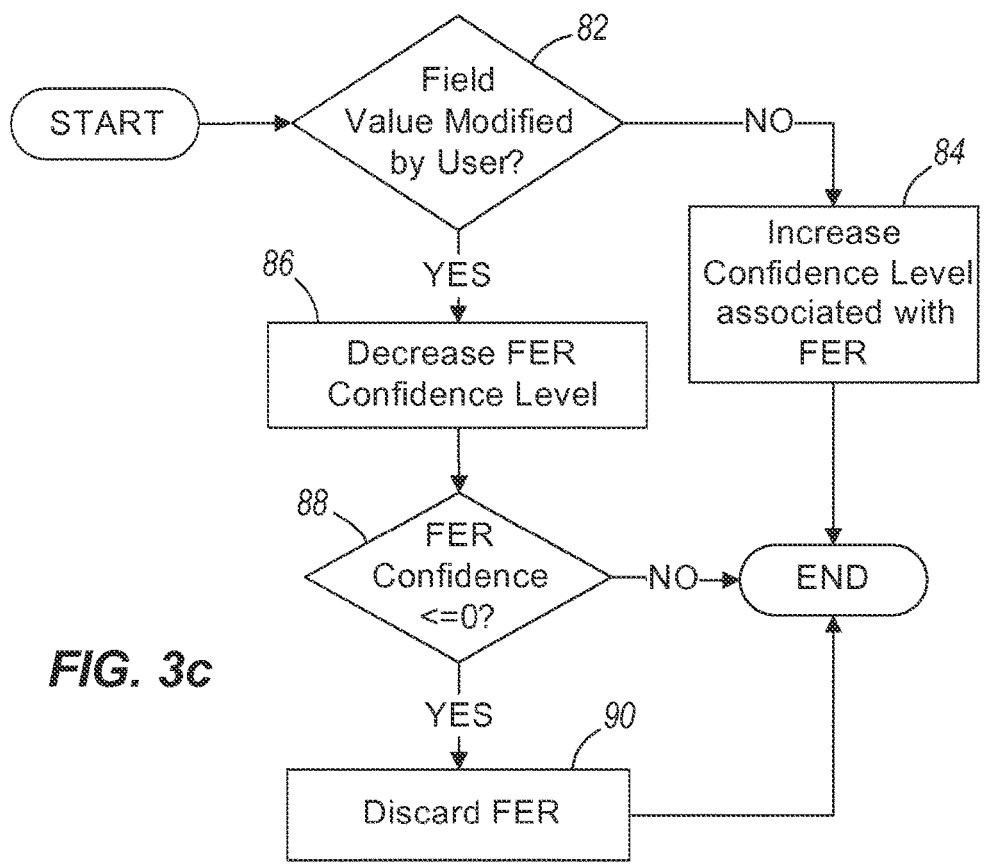

FIG. 3*c* illustrates actions performed by the AL module 23 to update the confidence level of a FER. To start the update process, the AL module 23 determines if the FER correctly determined the value for the data field for the most-recently processed document (i.e., determines if the user updated the value for the data field during user validation) (at 82). If the FER correctly identified the value, the AL module 23 increases the confidence level of the FER (e.g., adds "1" to the confidence level) (at 84). However, if the FER did not correctly determine the value for the data field (at 82), the AL module 23 decreases the confidence level of the FER (e.g., subtracts "1" from the confidence level) (at 86). After decreasing the confidence level, the AL module 23 also determines if the decreased confidence level has dropped below a predetermined threshold (e.g., zero) (at 88). If the confidence level of the FER has dropped below the predetermined threshold, the AL module 23 discards the FER (at 90), which results in a new FER being created as described above for document D1.

As shown in FIG. 3*c*, after updating the confidence level of the existing FER, automatic learning is complete and the system 10 waits for a subsequent document.

Accordingly as illustrated in the above example, the FER 70 is automatically set with the proper link between the document layout and the value of the document-signature data field. In particular, the AL module 23 has "learned" that the value of the document-signature data field is represented by the data extracted at position 2 of each document. The AL module 23 automatically learned this link or rule based on the user's business-as-usual interactions with the system 10. Accordingly, for each subsequent document processed by the system 10 with a similar layout as documents D1 and D2, the user no longer has to modify the value of the document-signature data field because the AL module 23 is able to automatically populate this field correctly using the FER 70. In addition, if the layout of the document changes over time (e.g., the name of the individual signing the document is now located at position 1 rather than position 2), the system 10 automatically adapts to this change as described above until it "learns" the new position (e.g., the confidence level of the FER eventually drops below the predetermined threshold and is discarded and a new FER is created with a proper link).

b. Indirectly-Linked Data (Smart Mode)

As noted above, the method 40 illustrated in FIG. 3 can be applied to populate data fields with values that are not directly represented in extracted data. For example, a sales order document typically includes a postal address for a ship-to address. However, a ship-to number data field may need to be populated with a numeric number that uniquely identifies the ship-to address specified the document. Therefore, although the document processed by the system 10 includes a postal address, the actual value needed to populate the ship-to number data field is not directly in the document. However, the ship-to number can be determined based on the postal address that is included in the document. Therefore, typically a user needs to manually key in this unique number by looking up the postal ship-to address specified in the document in a database, a paper-based manual, or another information source. Similarly, a sales order may include an item description but not a unique item number. The item description, however, can be used to look up or deduce the item number.

This type of indirectly-linked data can be referred to as "smartdata," and if such data is contained in a column of a table, the column is referred to as a "smartcolumn" (described in more detail in Section II below). The system 10 described above can be used to automatically learn links between data contained in a document and "smartdata." As was done above for directly-linked data, the functionality for learning "smartdata" will be described in the context of a set of example documents submitted to the system 10 for processing. For this example set of documents, the system 10 processes each document to populate a single data field for each document. The data field stores a numeric value representing a unique number assigned to the individual signing each document. Therefore, through the following examples, the data field is referred to as the signer-number data field or "Field1." This data field is identified as an "autolearnable" data field as described above. However, as compared to the example described above for directly-linked data, the value for the signer-number data field is not directly available in the processed documents. In particular, the documents processed by the system 10 include a name of the individual signing the document at position 2 but do not include the signer's assigned number. Therefore, the system 10 cannot directly link the signer-number data field to a position of extracted data. However, as described below in more detail, the system 10 automatically learns the unique number associated with each signer appearing in a document processed by the system.

i. Document D1

FIG. 7a illustrates an example first or initial document D1 submitted to the system 10 for processing. The document D1 includes four pieces of data (e.g., words) W1, W2, W3, and W4. Word W3 is located at position 1 ("Pos1"), word W4 is located at position 2 ("Pos2"), word W2 is located at position 3 ("Pos3"), and word W1 is located at position 4 ("Pos4"). In some embodiments, the positions of the words are represented as coordinates in an image of the document D1. The word W4 at position 2 represents a name of an individual signing the document. None of the words represented in document D1 include a unique number assigned to the individual signing the document.

Returning to FIG. 3, during the first phase, the document D1 is submitted to the system 10, and the managing module 24 calls the capturing module 20 and the analyzing module 21 to scan the document D1 and extract the words W1, W2, W3, and W4 (at 42). As part of this process, the document D1 is classified as associated with a particular template. As noted above, the template defines how and where to extract data from a submitted document and is applied by the capturing module 20 and the analyzing module 21.

After the words are extracted, the managing module 24 populates any "non-autolearnable" data fields and calls the AL module 23 to populate any "autolearnable" data fields (at 44). Therefore, because the signer-number data field is marked as an "autolearnable" data field, the managing module 24 calls the AL module 23 to populate this data field.

Figure 6A:
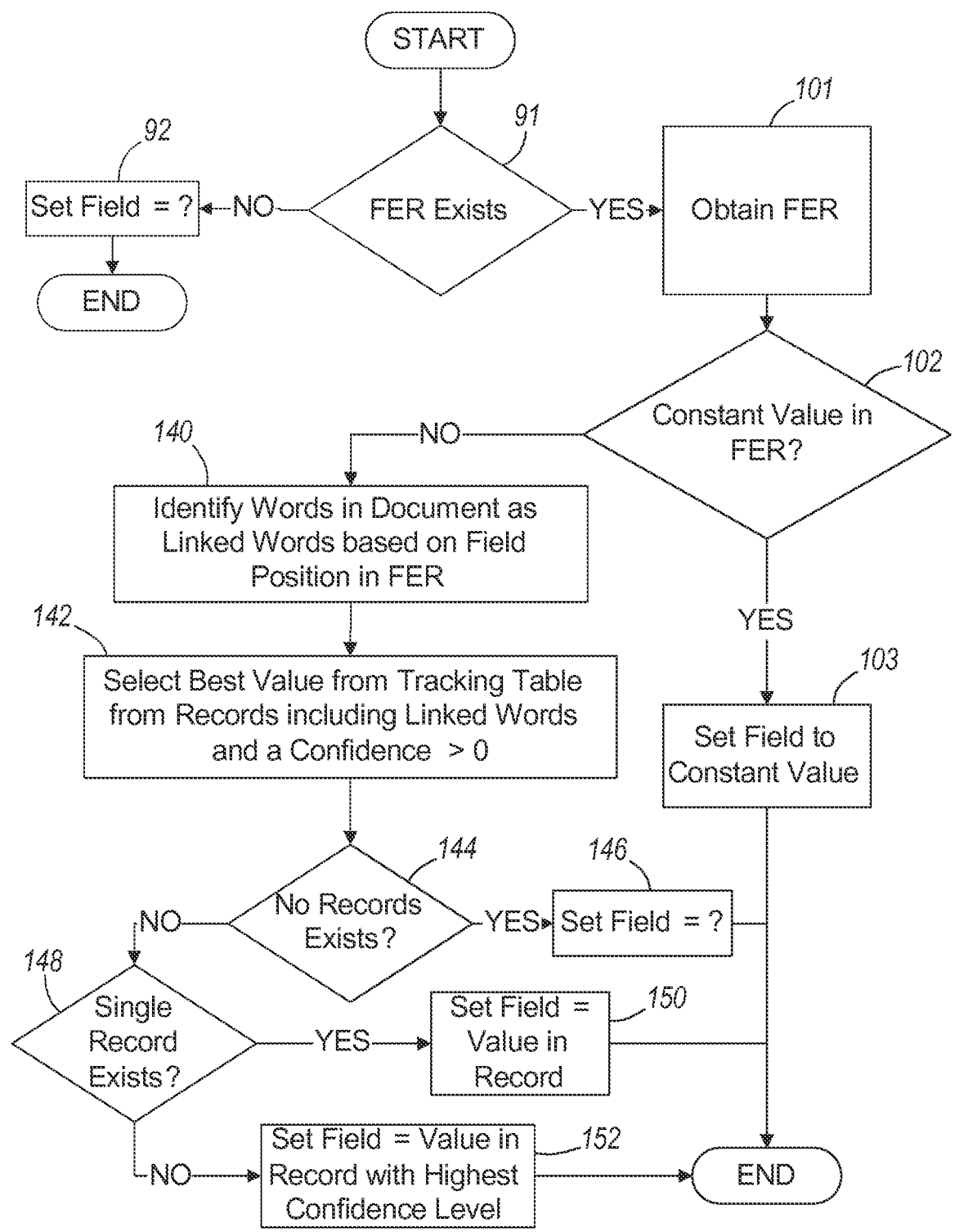
FIG. 6*a* is a flow chart illustrating a method performed by the system of FIG. 1 for capturing and analyzing a document during the method of FIG. 3 in a smart mode.

FIG. 6a illustrates the actions taken by the AL module 23 to populate an "autolearnable" data field in a smart mode (i.e., when the data field is populated with "smartdata"). As shown in FIG. 6a, the AL module 23 determines if a FER exists for the template used to extract the words from the document (at 91). As noted above, for each template, the system 10 builds a FER for each "autolearnable" data field that defines how to populate an "autolearnable" data field.

In some embodiments, the system 10 is initially set up without FERs, and the AL module 23 creates the FERs for a template the first time it encounters the template. Therefore, the AL module 23 can determine if any FERs exist by determining if it has seen the template classified with the submitted document. For example, assuming that document D1 is the first document processed by the system 10 for a particular process, no FER exists. Therefore, in this situation, no FERs exist that define how to populate the signer-number data field. Accordingly, as illustrated in FIG. 6a, the AL module 23 sets the value of the signer-number data field to null, "?," or a similar value indicating that no value can be determined (at 92). In some embodiments, the AL module 23 keeps track of encountered templates, which the AL module 23 uses to determine whether FERs exist for a particular document. For example, the AL module 23 can maintain a template table 95 as illustrated in FIG. 7b to keep track of encountered templates. The template table 95 includes records of encountered templates and each encountered template is identified by a template identifier 95a (i.e., "123456") and a document identifier 95b (i.e., "SignerNumber").

Returning to FIG. 6a, after the AL module 23 populates the signer-number data field (at 92), the process returns to FIG. 3 where the populated data field is displayed to the user for validation (at 46). In particular, the user interface module 22 displays data fields populated by the system 10 to a user for validation. As noted above, in some embodiments, the user interface module 22 also displays an image of the document that the user uses to validate the data field values. Returning to the example document D1, because the AL module 23 sets the signer-number data field to null, the user validates this data field by entering a value (e.g., using the image of the document D1 as a reference). For example, the user enters a value V1 for the signer-number data field. The value V1 represents a unique number assigned to the individual whose name is included in word W4 at position 2 in the document D1. After entering the value V1, the user selects an "approve" selection mechanism to save and submit the validated data fields for additional processing by other business processes (e.g., order processing, billing, accounts receivable, etc.).

Figure 6B:
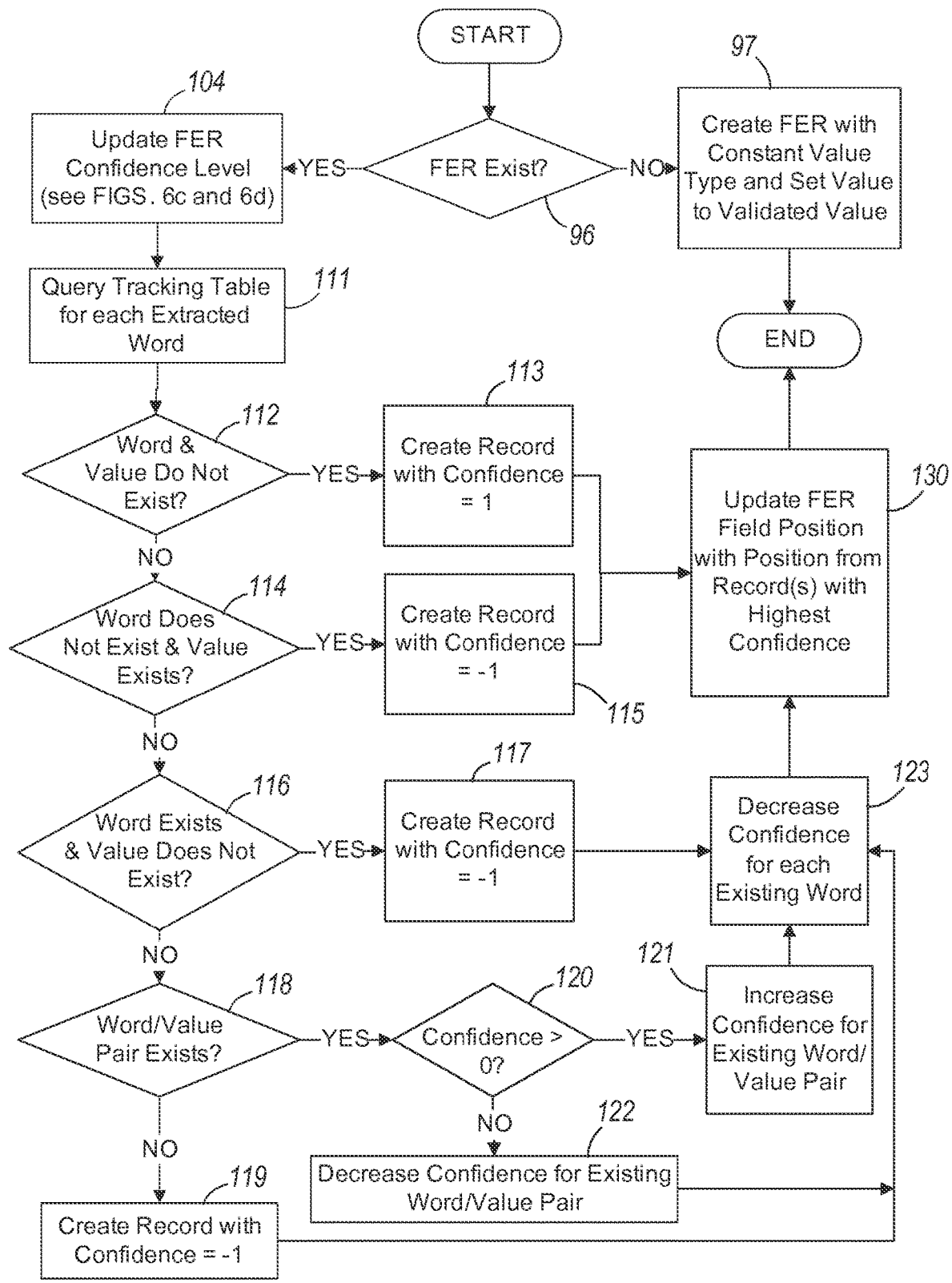

As shown in FIG. 3, after the user validates the data fields, the AL module 23 performs automatic learning (at 48). During automatic learning, the AL module 23 uses the user's validation of the data fields to establish or improve an FER for each data field. In particular, FIG. 6b illustrates actions taken by the AL module 23 to perform automatic learning. As illustrated in FIG. 6b, to start the automatic learning process, the AL module 23 determines if a FER exists for a particular data field (at 96). As noted above, the FERs are included in the template associated with the processed document and initially a template may not be associated with any FERs. Therefore, for the example document D1, the template (i.e., template "123456") does not yet include any FERs. Accordingly, when no FER exists for a data field (at 96), the AL module 23 creates an FER for the data field (at 97). For example, FIG. 7c illustrates an example FER 100 created for the signer-number data field. The FER 100 includes a rule identifier 100a, a template instance identifier 100b, a field type 100c, a field identifier 100d, a field value 100e, and a field position 100f. For the signer-number data field, the AL module 23 sets the rule identifier 100a to a unique number (e.g., "345678"), sets the field identifier 100d to an identifier associated with the signer-number data field (e.g., "Field1"), and sets the template instance identifier 100b to the identifier of the template to which the FER is associated with (i.e., "123456"). In addition, as illustrated in FIG. 7c, in some embodiments, when a FER is initially created, the AL module 23 sets the FER field type 100c to "constant" and sets the FER field value 100e to the value entered by the user for the most recently processed document (i.e., V1). Also, when the field type 100c is set to "constant," the AL module 23 sets the field position 100f to null or "N/A" because the FER is linked to a constant value and not to a position of data extracted from a document.

In certain embodiments, each FER is associated with a confidence level that tracks the recognition rate of the FER. A low confidence level is associated with a low recognition rate and a high confidence level is associated with a high confidence level. Therefore, a confidence level of an FER is increased when the FER properly populates a data field and is decreased when the FER improperly populates a data field. Also, as described below, a FER may be discarded if its confidence level gets too low. Initially, when an FER is created, the confidence level is set to a predetermined value, such as 10.

As shown in FIG. 6b, after creating a FER (at 97), the automatic learning process is complete, and the system 10 waits for a subsequent document.

ii. Document D2

FIG. 8a illustrates an example of a second document D2 processed by the system 10. The document D2 has a similar layout as document D1 and includes four pieces of data (e.g., words) W1, W2, W5, and W6. Word W5 is located at position 1, word W6 is located at position 2, word W2 is located at position 3, and word W1 is located at position 4. The word W6 located at position 2 includes the name of the individual signing the document. None of the words extracted from the document D2 include a unique number assigned to the individual signing the document.

As described above for document D1, the submitted document D2 is scanned to extract the words (at 42). The managing module 24 then calls the AL module 23 to populate the signer-number data field as illustrated in FIG. 6a. As shown in FIG. 6a, upon encountering the same template as classified with a previously-processed document, the AL module 23 obtains the FER associated with the template (at 101) and uses the FER to populate the data field. For example, if the FER for a particular data field includes a constant value (at 102), the AL module 23 populates the data field with the constant specified in the FER (at 103). Therefore, for the document D2, the AL module 23 populates the signer-number data field with the constant value V1 as specified in the FER 100.

Returning to FIG. 3, after the AL module 23 populates data fields, the user interface module 22 displays the populated data fields to a user for validation (at 46). As described above, the word at position 2 in each document submitted to the system 10 is the name of the individual signing the document. For document D1, word W4 was at position 2. However, word W6 is at position 2 in document D2. Therefore, two different individuals signed the documents D1 and D2. Accordingly, the value automatically populated by the AL module 23 for the signer-number data field for document D2 was incorrect. Accordingly, the user validates the data field by updating the field to a new value V2, which represents the unique number assigned to the individual whose name is included in word W6 at position 2 in document D2. The user then selects an "approve" selection mechanism displayed by the user interface module 22 to save and submit the validated data field for further processing.

After user validation, the AL module 23 performs automatic learning to establish or improve an FER for each validated data field (at 48). As illustrated in FIG. 6b, during automatic learning, the AL module 23 determines if a FER exists for a data field (at 96). As described above, if a FER does not exist for a particular data field, the AL module 23 creates a FER for the data field (at 97). Alternatively, if an FER exists, the AL module 23 updates the confidence level of the FER (at 104).

Figure 6C:
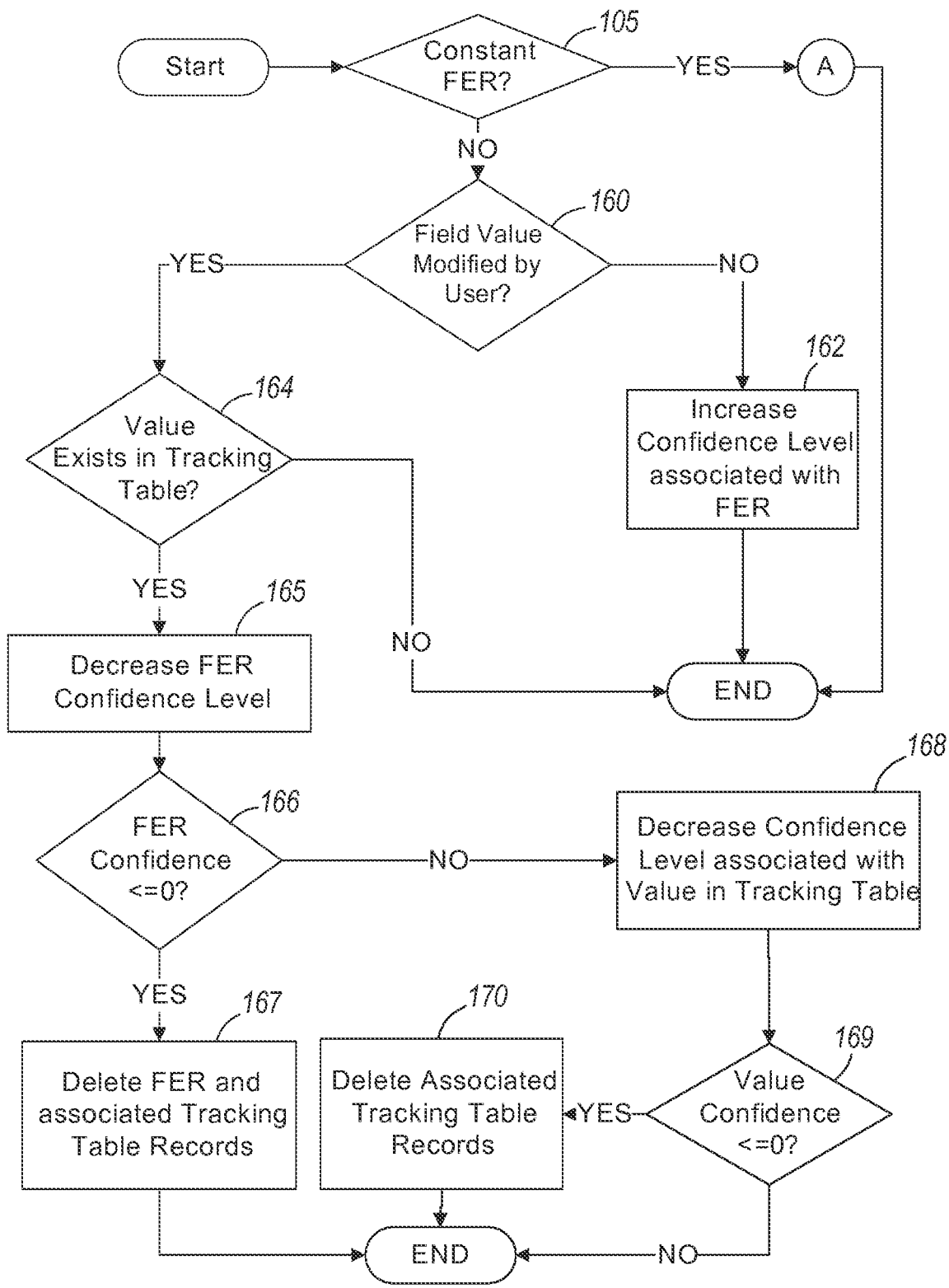

FIGS. 6c and 6d illustrate actions performed by the AL module 23 to update the confidence level of a FER. To start the update process, the AL module 23 determines if the value type of the FER needs to be updated. In particular, the AL module 23 determines if the FER includes a constant value (at 105, FIG. 6c). When the FER includes a constant value, the AL module 23 determines if the FER correctly determined the value for the data field for the most-recently processed document (i.e., determines if the user updated the value for the data field during user validation) (at 106, FIG. 6d). If the FER correctly determined the value, the FER does not need to be updated. In addition, if the FER correctly identified the value, the AL module 23 updates the confidence level of the FER (e.g., adds "1" to the confidence level) (at 107).

However, if the FER did not correctly determine the value (i.e., the constant value specified in the FER was updated by the user during user validation), the FER needs to be updated because clearly the data field associated with the FER is not a constant value. For example, the FER 100 created after document D1 was processed includes a constant value for the signer-number data field (i.e., V1). However, the user updated the value of the signer-number data field for document D2. Therefore, because the signer-number data field was validated with two different values, the data field should not be populated with a constant value. Accordingly, as shown in FIG. 8c, the AL module 23 converts the FER 100 to a non-constant type (also referred to as a "smartfield" type) (at 108, FIG. 6d).

After updating the confidence level of the FER (at 104, FIG. 6b), the AL module 23 returns to the automatic learning process to update or build a tracking table for each updated FER. The tracking table tracks words extracted from documents processed by the system 10 and the validated values for each "smartdata" data field. For example, FIG. 8b illustrates an example tracking table 110 associated with the FER 100. The table 110 includes each word extracted from documents D1 and D2 and both validated values for the signer-number data field (e.g., V1 and V2). In particular, each record includes an extracted word 110a (e.g., W1, W2, W3, and W4), a field identifier 110b (e.g., "Field1"), a template instance identifier 110c, a validated field value 110d for the document where the word was extracted from (e.g., V1 or V2), a confidence level 110e, and a word position 110f. As described in more detail below, the word confidence level 110d tracks the confidence that an extracted word is linked to the value of a "smartdata" data field. The higher the confidence level, the higher the confidence of the link. Also, in some embodiments, the word position 110f is only used when the confidence level of a particular record is greater than zero. Therefore, as illustrated in FIG. 8b, the word position 110f is not populated for records associated with a confidence level that is less than zero.

To build a tracking table, the AL module 23 determines what records need to be added to or updated in the existing tracking table. In some embodiments, because a tracking table is not needed for constant FERs, the tracking table is initially empty for a particular FER until the FER is converted to a non-constant type (e.g., to reduce processing and memory requirements). In these situations, extracted words and data field values from previously-processed documents may need to be added to the tracking table when it is eventually created. Therefore, the AL module 23 keeps a list of extracted words and/or data field values for at least some previously-processed documents (e.g., the past five documents processed by the system 10). For example, in some embodiments, the AL module 23 retains an image of previously-processed documents and uses the images to populate the tracking table as needed. In other embodiments, to eliminate the need to build the tracking table based on previously-processed documents, AL module 23 creates a tracking table when the system 10 processes a first document regardless of whether the FER includes a constant value.

To determine how to update the existing tracking table, the AL module 23 queries the tracking table (which may be empty) for each extracted word from the most-recently processed document and the validated value for the data field for the most-recently processed document (at 111, FIG. 6b). As noted above, if the tracking table is being created for the first time, the AL module 23 queries the tracking table for each extracted word and the associated validated data field value from the current document (e.g., document D2) and from one or more previously-processed documents (e.g., document D1).

If both an extracted word and an associated validated value do not exist in the tracking table (at 112), the AL module 23 creates a new record for the tracking table that includes the word, the data field identifier, the template identifier, the validated value of the data field, a confidence level of "1," and the position of the word in the document (at 113). For example, the last record illustrated in the table 110 includes the word W6, the identifier of the signer-number data field (i.e., "Field1"), the template identifier (i.e., 123456), the value V2 validated by the user for the document D2, a confidence level of "1," and position 2, which is the position of the word W6 in document D2.

Alternatively, if the word does not exist in the table but the value does (at 114), the AL module 23 creates a new record for the tracking table that includes the word, the data field identifier, the template identifier, the validated value of the data field, an initial confidence level of "−1," and the position of the word (at 115). The confidence level for a new record in this situation is lower than the confidence level for a new record where both the word and the value do not exist in the table because there is a lower possibility that the word and the validated value are linked since the value was already seen associated with a different word.

Similarly, if the word exists in the table but the value does not exist (at 116), the AL module 23 creates a new record for the table that includes the word, the data field identifier, the template identifier, the validated value of the data field, an initial confidence level of "−1," and the position of the word (at 117). Again, the confidence level for a new entry where the word already exists in the table is low because there is a lower possibility that the word and the validated value are linked since the word was already seen associated with a different value.

If both the word and the value exist in the table (steps 112, 114, and 116 fail), the AL module 23 determines if the word and the value exist as a pair in the same record in the table (at 118). If the word and the value both exist in the table but not in the same record, the AL module 23 creates a new entry for the tracking table that includes the word, the data field identifier, the template identifier, the validated value of the data field, an initial confidence level of "−1," and the position of the word (at 119). As noted above, the confidence level is low because it unlikely that the word and the value are linked since both the word and value were seen before but were not previously linked.

On the other hand, if the word and the value both exist in the tracking table as a pair in an existing record (at 118), the AL module 23 determines if the confidence level of the existing record is greater than a predetermined threshold (e.g., zero) (at 120). If the confidence level is greater than the predetermined threshold, the AL module 23 increases the confidence level (e.g., adds "1" to the confidence level) of the existing record (at 121). If the confidence level is not greater than the predetermined threshold, the AL module 23 decreases the confidence level (e.g., subtracts "1" from the confidence level) of the existing record (at 122).

In addition, as shown in FIG. 6b, if an extracted word already exists in the table regardless of the status of the associated value (i.e., steps 112 and 114 fail), the AL module 23 decreases the confidence level (e.g., subtracts "1" from the confidence level) of each existing record containing the word (at 123) to indicate that the confidence of these existing links has been lowered due to the addition of yet another value associated with the same word.

After the tracking table has been updated, the AL module 23 updates the FER (at 130). In particular, the AL module 23 updates the field position of the FER with the position(s) associated with the records in the tracking table having the highest confidence level (i.e., if the FER does not include a constant value). For example, using the example tracking table 110 illustrated in FIG. 8b, the records associated with the words W3, W4, W5, and W6 each have a confidence level of "1," which is the highest confidence level in the table 110. These words are located in positions 1 and 2 in documents D1 and D2. Therefore, the AL module 23 adds positions 1 and 2 to the field position of the FER 100 (see FIG. 8c).

As shown in FIG. 6b, after updating the field position of the FER (at 130), the automatic learning process is complete, and the system 10 waits for a subsequent document.

iii. Document D3

Figure 9A:
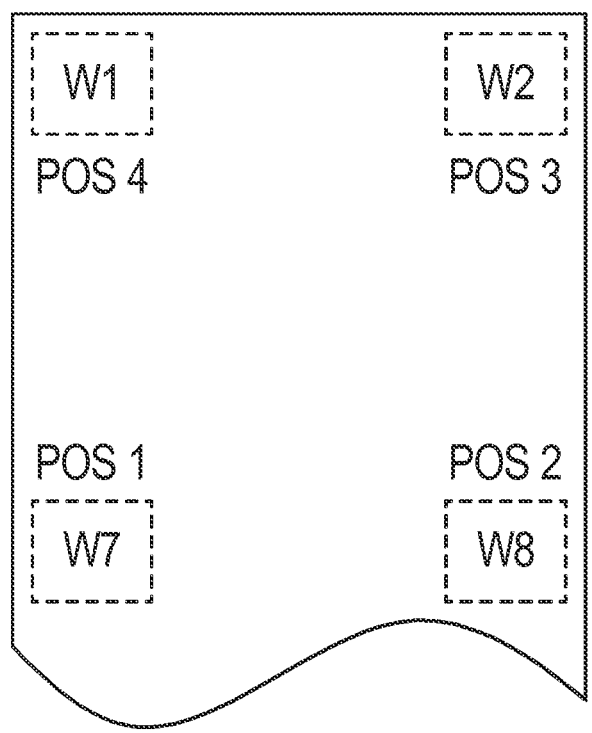
FIG. 9*a* illustrates a third example document processed by the system of FIG. 1 in a smart mode.

FIG. 9a illustrates an example third document D3 processed by the system 10. The document D3 has a similar layout as documents D1 and D2 and includes four pieces of data (e.g., words) W1, W2, W7, and W8. Word W8 is located at position 1, word W7 is located at position 2, word W2 is located at position 3, and word W1 is located at position 4. The word W7 located at position 2 includes the name of the individual signing the document. None of the extracted words include a unique number assigned to the individual signing the document.

As described above for documents D1 and D2, the submitted document D3 is scanned to extract the words (at 42). The managing module 24 then calls the AL module 23 to populate the signer-number data field as illustrated in FIG. 6a. As shown in FIG. 6a, to populate the signer-number data field, the AL module 23 obtains the FER 100 (at 101) and uses the FER 100 to populate the data field. In particular, when the FER does not include a constant value (at 102), the AL module 23 identifies extracted words in the document D3 that are considered linked words to the signer-number data field based on the field position of the FER 100 (at 140). As illustrated in FIG. 8c, the FER 100 includes positions 1 and 2. Therefore, the AL module 23 determines which words in document D3 are in positions 1 and 2. For document D3, the words W8 and W7 are located in positions 1 and 2, and, therefore, words W8 and W7 are considered linked words for the signer-number data field.

After the AL module 23 determines the linked words (at 140), the AL module 23 selects the best potential value for the signer-number data field using the linked words and the tracking table. In particular, the AL module 23 determines if the linked words are included in the tracking table and have a confidence level greater than a predetermined threshold (e.g., zero) (at 142). By checking that the linked words are associated with a positive confidence level, the AL module 23 avoids using a record from the table that is associated with a low likelihood of being linked to the data field value. For example, if the extracted word W8 appears in the tracking table but is associated with a confidence level of "−2," it is unlikely that the validated value associated with the word W8 in the table is a good potential value for the signer-number data field.

If the tracking table does not include any records including the linked words with a confidence level greater than the predetermined threshold (at 144), the AL module 23 sets the value of the signer-number data field to null, "?," or a similar value indicating that a value could not be determined (at 146). For example, as illustrated in FIG. 8b, the table 110 does not include any records associated with the extracted words W8 or W7. Therefore, the AL module 23 is not able to identify any records in the table 110 with a potential value for the signer-number data field. Accordingly, in this situation, the AL module 23 sets the signer-number data field to null, "?," or a similar value indicating that no value can be determined (at 146).

However, if the AL module 23 determines that the tracking table includes a single record associated with the word W8 or the word W7 and the single record has a confidence level greater than the predetermined threshold (at 148), the AL module 23 sets the value of the signer-number data field to the validated value included in the single record (at 150).

In addition, if the tracking table includes multiple records associated with the extracted words W8 and/or W7 that each have a confidence level greater than the predetermined threshold (steps 144 and 148 fail), the AL module 23 sets the value of the signer-number data field to the validated value included in the record with the highest confidence level (at 152). It should be understood, however, that it is possible to have multiple records in the tracking table associated with the linked words that each have the highest confidence level. In this situation, if the all of the records having the highest confidence level include the same validated value, the AL module 23 sets the value of the signer-number data field to the validated value of these records. However, if some of the records having the highest confidence level include different validated values, the AL module 23 sets the value of the signer-number data field to null, "?," or a similar value indicating that no value can be determined.

Returning to FIG. 3, after the signer-number data field is populated for document D3, it is displayed to a user for validation (at 46). Because the data field was set to null (because no records existed in the tracking table 110 for the linked words W8 or W7), the user validates the data field by providing a value V3 representing the unique number assigned to the individual whose name is included in word W8 in position 2 of document D3. The user then selects an "approve" selection mechanism displayed by the user interface module 22 to save and submit the validated data field.

As shown in FIG. 3, after user validation, the AL module 23 performs automatic learning (at 48). As illustrated in FIG. 6b, as part of automatic learning, the AL module 23 updates the confidence level of each existing FER (at 104). As shown in FIG. 6c, if an FER does not include a constant value (at 105), the AL module 23 determines if the user modified the value of the data field populated by the FER during user validation (at 160). If the user did not modify the value, the FER properly provided a value for the data field. Therefore, the AL module 23 increases the confidence level associated with the FER (e.g., add "1" to the level) (at 162).

If the user did modify the value populated by the FER (at 160), the AL module 23 determines if the modified value entered by the user exists in the tracking table (at 164). If the value exists in the tracking table, the AL module 23 decreases the confidence level of the FER (e.g., subtracts "1" from the level) to indicate that the FER improperly populated the value even though the proper value was in the tracking table (at 165). After decreasing the confidence level of the FER, the AL module 23 determines if the decreased confidence level is less than or equal to a predetermined threshold (e.g., zero) (at 166). If the decreased confidence level of the FER has dropped to the predetermined threshold or below, the AL module 23 deletes the FER and, optionally, deletes the records from the tracking table associated with the validated value (at 167). Alternatively, if the decreased confidence level of the FER remains greater than the predetermined threshold (at 166), the AL module 23 decreases the confidence level (e.g., subtracts "1" from the level) of each record in the tracking table that included the value (at 168). In addition, if the decreased confidence level of any of these records falls to or below a predetermined threshold (e.g., zero) (at 169), the AL module 23 also deletes these records from the tracking table (at 170).

Deleting records and FERs allows the system 10 to build new FERs and tracking table records that perform better. For example, if the layout of a document changes, the system 10 automatically and quickly adapts to the new layout by discarding existing FERs and tracking table records that do not work properly with the new layout. Also, in some embodiments, in addition to or in place of deleting FERs, the AL module 23 creates multiple FERs for a particular data field and uses the FER for each newly submitted document that currently has the highest confidence level (or the greater increase in confidence level over a period of time). Therefore, in some situations, two documents may be associated with the same template but a data field associated with each document may each be processed using a different FER.

Returning to FIG. 6*b*, after AL module 23 updates the confidence level of the FER (at 104), the AL module 23 continues the automatic learning process by updating the tracking table (at 111-123). As described above with respect to document D2, as part of updating the tracking table, the AL module 23 determines if the validated value V3 and the extracted words W1, W2, W7, and W8 associated with document D3 exist in the table and updates the table accordingly. FIG. 9*b* illustrates the tracking table 110 after being updated based on document D3.

After updating the tracking table, the AL module 23 updates the field position of the FER (at 130). As described above, the AL module 23 updates the field position of the FER based on the record(s) in the tracking table with the highest confidence level. For example, based on the example tracking table 110 illustrated in FIG. 9*b*, the records associated with the pairs W3 and V1, W4 and V1, W5 and V2, W6 and V2, W7 and V3, and W8 and V3 are each associated with a confidence level of "1," which is the highest level in the table 110. Therefore, the AL module 23 updates the field position of the FER 100 to reference the positions associated with these records (i.e., "Pos1" and "Pos2"). As illustrated in FIG. 8*c*, the FER 100 field position already referenced these positions; therefore, the FER 100 does not change in this situation.

As shown in FIG. 6*b*, after updating the FER (at 130), the automatic learning process is complete, and the system 10 waits for a subsequent document.

iv. Document D4

Figure 10A:
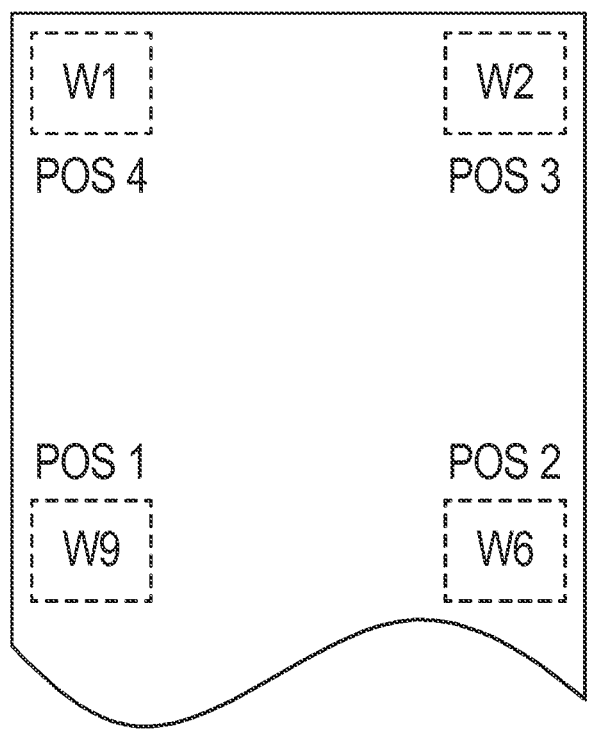
FIG. 10a illustrates a fourth example document processed by the system of FIG. 1 in a smart mode.

FIG. 10*a* illustrates an example fourth document D4 processed by the system 10. The document D4 has a similar layout as documents D1, D2, and D3 and includes four pieces of data (e.g., words) W1, W2, W6, and W9. Word W9 is located at position 1, word W6 is located at position 2, word W2 is located at position 3, and word W1 is located at position 4. The word W6 located at position 2 includes the name of the individual signing the document D4. None of the extracted words from the document D4 include a unique number assigned to the individual signing the document.

As described above for documents D1, D2, and D3, the submitted document D4 is scanned to extract the words (at 42). The managing module 24 then calls the AL module 23 to populate the signer-number data field as illustrated in FIG. 6*a*. As shown in FIG. 6*a*, to populate the signer-number data field, the AL module 23 obtains the FER 100 (at 101) and uses the FER 100 to populate the data field. In particular, the AL module 23 identifies extracted words in the document D4 that are considered linked words to the signer-number data field based on the field position of the FER 100 (at 140). As illustrated in FIG. 8*c*, the FER 100 includes positions 1 and 2. Therefore, the AL module 23 determines which words in document D4 are in positions 1 and 2. For document D4, the words W9 and W6 are located in positions 1 and 2, and, therefore, words W9 and W6 are considered linked words for the signer-number data field.

After the AL module 23 determines the linked words, the AL module 23 selects the best potential value for the signer-number data field using the linked words and the tracking table. In particular, the AL module 23 determines if the linked words are included in records in the tracking table having a confidence level greater than a predetermined threshold (e.g., zero) (at 142). For document D4, the tracking table 110 (see FIG. 9*b*) includes a single record including word W6 (at 148). Therefore, the AL module 23 selects the value V2 from this record as the best potential value of the signer-number data field for document D4 and populates the signer-number data field accordingly (at 150).

Returning to FIG. 3, after the signer-number data field is populated by the AL module 23, it is displayed to a user for validation (at 46). As noted above, the name of the individual signing the document is located at position 2 of each document. Therefore, word W6 in document D4 represents the name of the individual signing the document D4. In addition, as illustrated in the tracking table, another document (document D2) included the word W6 in position 2 and for that document the signer-number data field was set to V2. Accordingly, using the information in the FER and the tracking table, the AL module 23 correctly identified the value for the signer-number data field and the user does not need to modify the value. Rather, the user simply selects an "approve" selection mechanism displayed by the user interface module 22 to save and submit the validated data field.

After the user validation, the AL module 23 performs automatic learning (at 48) and updates the confidence level of the FER (at 104, FIG. 6*b*). To update the FER confidence level, the AL module determines if the user modified the value of the data field populated by the FER during user validation (at 160). If the user did not modify the value, the FER properly provided a value for the data field. Therefore, the AL module 23 increases the confidence level associated with the FER (e.g., add "1" to the level) (at 162). Accordingly, because the FER 100 properly identified the value for the signer-number data field for document D4, the AL module updates the confidence of the FER 100 accordingly (at 162).

Figures 10B, 10C:
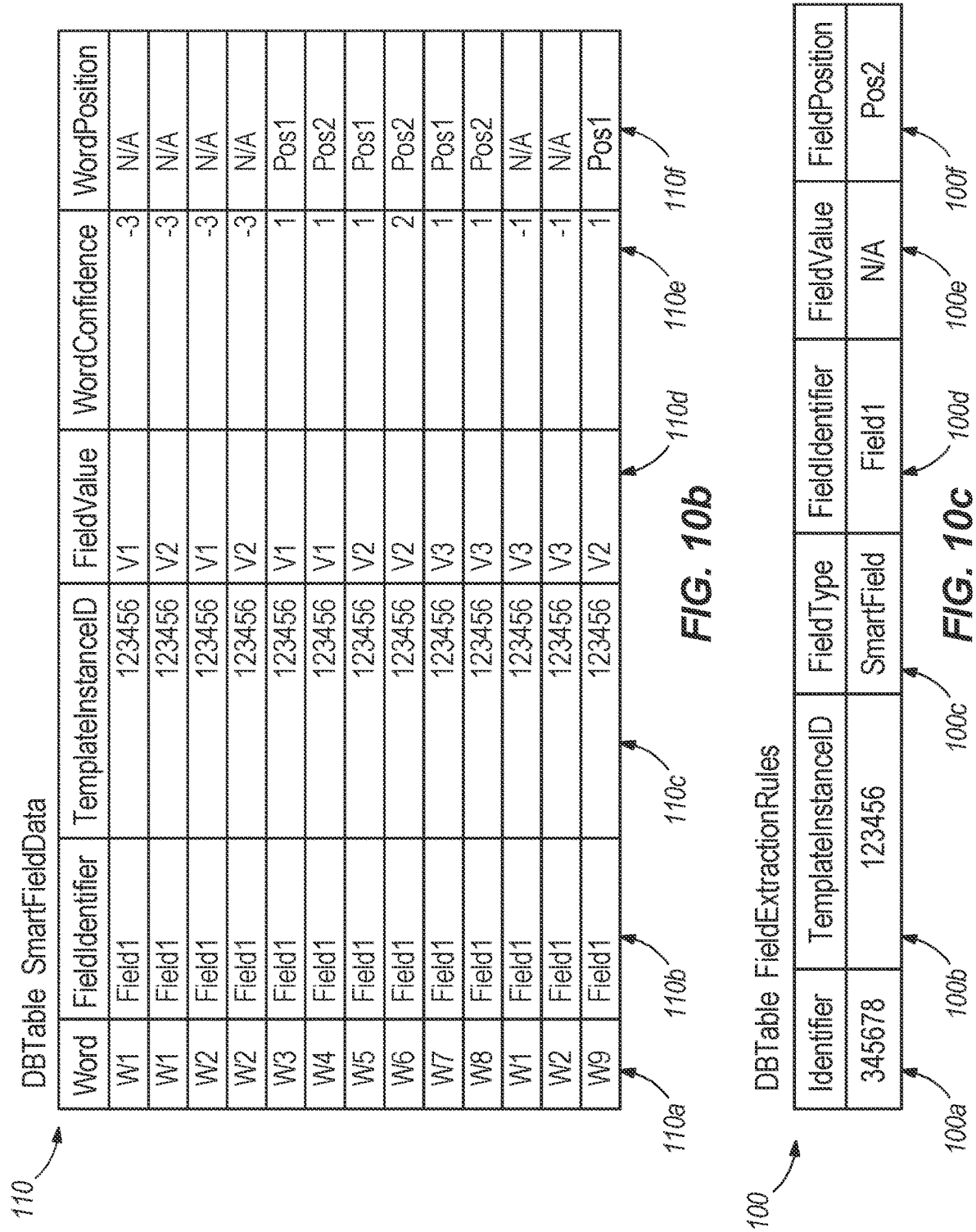

Returning to FIG. 6*b*, after updating the FER, the AL module 23 updates the tracking table (at 111-123) as described above with respect to document D2. For example, FIG. 10*b* illustrates the tracking table 110 after being updated based on document D4. After updating the tracking table, the AL module 23 updates the field position of the FER (at 130). As described above, the AL module 23 updates the field position of the FER based on the record(s) in the tracking table with the highest confidence level. For example, based on the example tracking table 110 illustrated in FIG. 10*b*, the record associated with the pair W6 and V2 is associated with a confidence level of "2," which is the highest level in the table 110. Therefore, the AL module 23 updates the field position of the FER 100 to reference the position associated with this record (i.e., "Pos2") (see FIG. 10*c*). Accordingly, the FER 100 is now set with the proper link between the document layout and the value of the signer-number data field. In particular, the AL module 23 has "learned" that the value of the signer-number data field is indirectly-linked to the data extracted at position 2 of each document and the tracking table provides the value of the signer-number data field based on the data extracted at position 2. The AL module 23 automatically learned this link or rule based on the user's business-as-usual interactions with the system 10.

Accordingly, for each subsequent document processed by the system 10 with a similar layout as documents D1, D2, D3, and D4, the user may not need to modify the value of the signer-number data field because the AL module 23 is able to automatically populate this field correctly using the FER 100 and the tracking table 110. In addition, if the layout of the document changes over time (e.g., the name of the individual signing the document is now located at position 1 rather than position 2), the FER 100 and the tracking table 110 automatically adapt to this change as described above until the system 10 "learns" the new position. Similarly, if an individual's unique number changes, the FER 100 and the tracking table 110 automatically adapt to this change as described above until the system 10 "learns" the new number associated with a particular individual's name.

II. Table Recognition Data a. Directly-Linked Data

As noted above, the method 40 illustrated in FIG. 3 can be used to extract data from a table included in a document. Many business documents, such as order forms and bills, include a table of data that needs to be extracted and matched to data fields. As described in more detail below, the system 10 uses rules, in the form of table recognition models, to extract table data and map the extracted data to table data fields. In addition, the system builds and improves the table recognition models, similar to the FERs described above, as it automatically learns how to link extracted table data to particular table data fields.

To process documents containing tables, the documents are first recognized and classified as associated with a particular template. Documents associated with the same template generally have the same characteristics and tables contained in these documents are generally recognized and extracted by the same table recognition models associated with the template. After a document is classified with a particular template, one of the table recognition models associated with the template is applied to extract the table from the document. Like the FERs, the system 10 may not initially be preprogrammed with any table recognition models. Rather, the system builds an initial table recognition model after validation of a first document processed by the system 10 with regard to a particular template.

Figure 11:
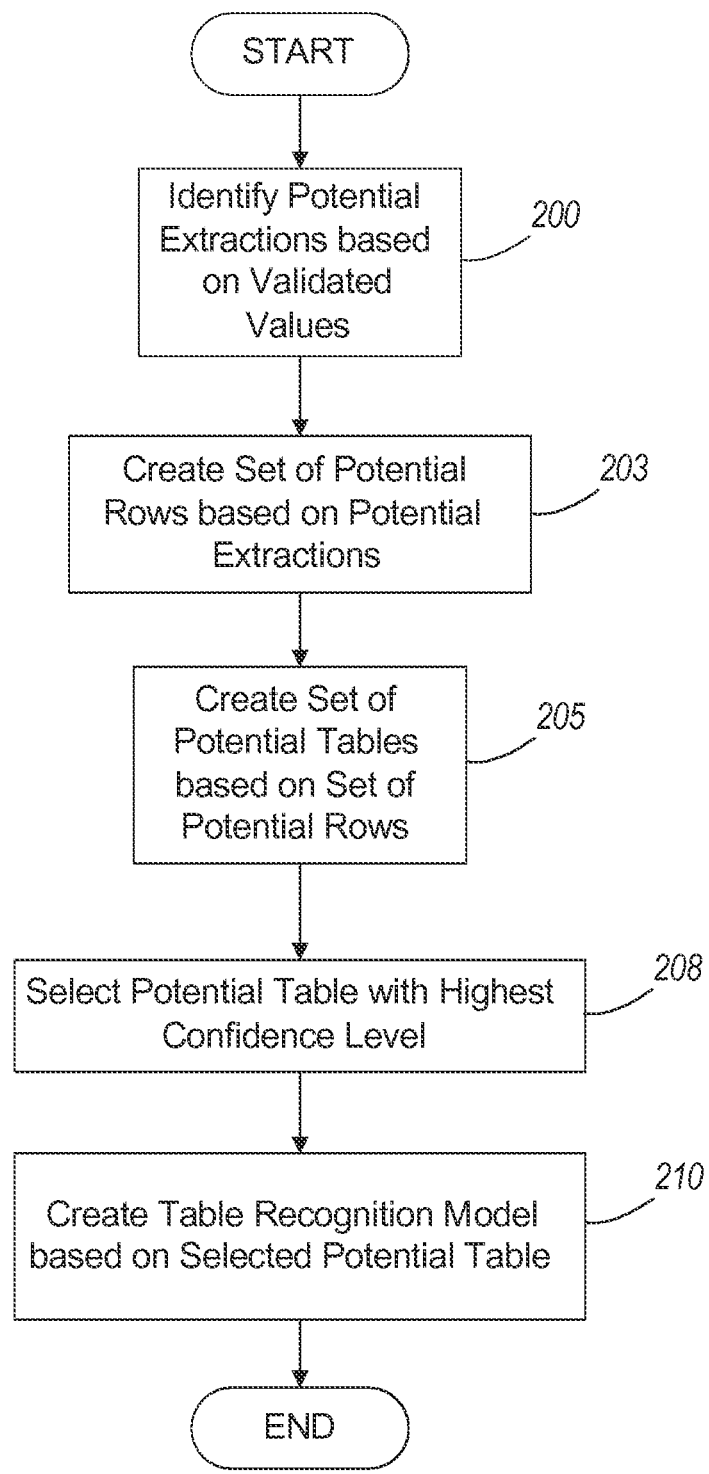
FIG. 11 is a flow chart illustrating a method of building a table recognition model performed by the system of FIG. 1.

For example, after data fields associated with a table in a first document are processed by the system 10 and validated by a user, the AL module 23 builds an initial table recognition model (see FIG. 11). To build an initial model, the AL module 23 uses an image of a recently-processed document to identify one or more potential extractions from the document that correspond with each table value validated by the user (at 200). The AL module 23 assigns a confidence level to each potential extraction indicating a degree of match between the extraction and the validated value (e.g., in terms of format and substance).

For example, assuming that one of the table values validated by the user for the table 201 was the text value "ESK-EDP3-25," the AL module 23 searches for text contained in the table 201 that potentially corresponds to this text value. As illustrated in FIG. 12, the AL module 23 identifies the text strings "ESK-EDP3-25" and "ESK-EPP-EDP3-25" included in the table 201 as being potential extractions 202 for the validated value "ESK-EDP3-25." The AL module assigns the potential extraction "ESK-EDP3-25" a confidence level of 100 because the text string exactly matches the validated value (in both format and substance). Similarly, the AL module 23 assigns the potential extraction "ESK-EPP-EDP3-25" a confidence level of 73 because, although the text string includes all of the same letters as the validated value, it also includes some additional letters. In some embodiments, confidence levels are assigned by identifying in the entire document the text having the maximum matched characters and minimum undesired characters. This text is assigned the highest available confidence level. In general, as compared to this text, other identified text having fewer matching characters and/or more undesired characters is assigned a lower confidence level. A lookup table can also be used to classify characters having similar glyph, which can be used to identify characters as matching even if they are not truly identical. In this situation, the text will be assigned a lower confidence level then if the characters were truly identical. The resulting confidence level of each extract text is then re-evaluated relative to data format (e.g., text, numeric, etc.) and its correctness is compared to the value validated by the user.

For example, assuming that another value validated by the user for the table 302 illustrated in FIG. 12 was the number "25080" having a numeric decimal format (e.g., "123, 456.7890"), the AL module 23 identifies multiple decimal numbers in the table 201. In particular, as illustrated in FIG. 13, the AL module 23 identifies the number "2,500" under "Description" having a numeric format of "123 456.7890," the number "2,506.00" under "rate" having a numeric format of "123,456.7890," and the number "25,080.00" under "amount" having a numeric format of "123,456.7890" as potential extractions 202. The AL module 23 assigns the number "2,500" a confidence level of 66, the number "2,506.00" a confidence level of 71, and the number "25,080.00" a confidence level of 100 because the format and substance of the number matches the validated value exactly.

The AL module 23 treats each potential extraction 202 as a cell in the table 201 and combines the potential extractions to create a set of potential rows (at 203, FIG. 11). The AL module 23 assigns each potential row a confidence level based on the homogeneity of the cells contained in the row and the individual confidence levels of each cell. For example, the two potential extractions 202 associated with the validated value "ESK-EDP3-25" can be combined with the three potential extractions 202 associated with the validated value "25080" to create a set of potential rows for the table 201. FIGS. 14-16 illustrate potential rows 204 for the table 201. As illustrated in FIG. 14, the potential row 204 containing the text string "ESK-EDP3-25" and the number "25,080.00" are assigned the highest confidence level since each of these cells are associated with a confidence level of 100.

After all potential rows are created, the AL module 23 uses the potential rows 204 to create a set of potential tables (at 205, FIG. 11). FIGS. 17 and 18 illustrate potential tables 206 for the table 201. As illustrated in FIGS. 17 and 18, each potential table 206 is assigned a confidence level based on the homogeneity and confidence levels of the rows contained in the table. The confidence level of each potential table 206 identifies how closely the potential table matches the table as validated by the user.

After creating the potential tables 206, the system 10 identifies the potential table 206 with the highest confidence level (at 208, FIG. 11) and uses the table to create a table recognition model (at 210). For example, a table recognition model includes a landmark, one or more columns, and a footer. The landmark represents an area in the document where the table starts and is used by the system 10 to determine the horizontal translation of the current document as compared to a reference document (i.e., the reference document used to generate the existing table recognition model). In some embodiments, the landmark is optional, and, if no landmark is specified, the system 10 sets the start of the table as the beginning of the document. Similar to the landmark, the footer marks the end of the area defining the table. The system 10 ignores data found after the footer.

The one or more columns are represented by a position and a format (e.g., date, numeric, text, etc.). Initially, the table recognition model includes all potential columns represented in the table. However, over time, the system 10 modifies the columns in a table recognition model to include only those columns used to populate the data fields associated with the table. For example, some columns in a table may be duplicates or unnecessary (e.g., a description of an item provided in addition to a unique item identifier). Also, some columns in a table may have the same data and these columns can be described in a table recognition model as "interchangeable" until a subsequent document with different data in these columns is processed by the system 10, which allows the system 10 to distinguish the columns.

Therefore, the AL module 23 uses the column positions and alignments, the original data formats in the document, the landmark of the table starting position, and the table footer represented in the selected potential table 206 to create a table recognition model capable of recognizing and extracting similar tables in subsequent documents. For example, FIG. 19 illustrates a landmark 211, columns 212, and a footer 213 identified in a selected potential table 206 for the table 201. These components are included in the table recognition model. For example, the system 10 defines the landmark 211 for the table 201 of FIG. 19 as provided by the following example code:

```
<Landmark>
    <Columns>3</Columns>
    <Row>0</Row>
    <StartPage>0</StartPage>
    <StopPage>0</StopPage>
    <Left>137</Left>
    <Top>49</Top>
    <Right>1474</Right>
    <Bottom>67</Bottom>
    <AverageLineHeight>18</AverageLineHeight>
    <Confidence>75</Confidence>
    <Cell>
        <Page>0</Page>
        <Column>0</Column>
        <Confidence>100</Confidence>
        <Left>137</Left>
        <Top>49</Top>
        <Right>191</Right>
        <Bottom>67</Bottom>
        <AverageLineHeight>18</AverageLineHeight>
        <Word>
            <Left>137</Left>
            <Top>49</Top>
            <Right>191</Right>
            <Bottom>67</Bottom>
            <Confidence>100</Confidence>
            <Text>ITEM</Text>
        </Word>
    </Cell>
    <Cell>
        ...
    </Cell>
    <Cell>
        ...
    </Cell>
</Landmark>
```

Similarly, the system 10 defines the "QTY" column 212 of the table 201 of FIG. 19 as provided by the following example code:

```
<Column>
    <Name index = "0"/>
    <Alias index = "0"/>Quantity</Alias>
```

```
    <Type>0</Type>
    <Precision>-1</Precision>
    <BaseRows>4</BaseRows>
    <Confidence>100</Confidence>
    <Top>0</Top>
    <Bottom>0</Bottom>
    <Left>29</Left>
    <Right>259</Right>
    <Alignment>113</Alignment>
    <ExtendedLeft>21</ExtendedLeft>
    <ExtendedRight>298</ExtendedRight>
    <MinCellLineCount>1</MinCellLineCount>
    <MaxCellLineCount>1</MaxCellLineCount>
    <FormatinDocument>
        <Format>
            <Type>3</Type>
            <Expression>^[0-9A-z-]+$</Expression>
            <Precision>-1</Precision>
            <Confidence>100</Confidence>
            <TotalData>4</TotalData>
        </Format>
    </FormatinDocument>
    <FormatOutput>
        <Format>
            <Type>0</Type>
            <Confidence>100</Confidence>
            <TotalData>0</TotalData>
        </Format>
    </FormatOutput>
</Column>
```

After an initial table recognition model is created as described above for a first document processed by the system, the table recognition model is applied to the next document submitted for processing that is classified with the same template as the first document. For example, the system 10 uses the landmark included in the table recognition model to locate the starting position of a table in a document. The landmark generally has the same structure as a row in the table but includes a data field having a text format for each cell. FIG. 20 illustrates an example landmark 300 identified in a table 302 included in document using the table recognition model. As shown in FIG. 20, the landmark 300 corresponds to the header row of the table 302. If the start of a table in a document cannot be located based on the landmark (or if no landmark is set for the table recognition model), the system 10 uses the beginning of the page of the document as the table starting position.

Once the table starting position is identified, the system 10 extracts the columns of the table. In some embodiments, all text positions and dimensions in the document are analyzed to form lines of text. Therefore, the column positions specified in the table recognition model are used to construct text blocks 304 inside of columns (see FIG. 21), wherein each text block 304 is considered a cell in a column. Accordingly, after the columns have been constructed, a table of a single row has been identified in the document.

Next, using the column characteristics, such as alignment, and regular expressions describing the column data format included in the table recognition model, the system 10 analyzes each text block 304 line-by-line to break the block 304 into one or more rows 306 (see FIG. 22). The system 10 then applies the footer to determine an end 308 of the table 302 (see FIG. 23). As shown in FIG. 23, using the footer, the system 10 discards some rows or data from the table 302 identified in the previous steps (e.g., the total row of the table is discarded because is appears after the end 308).

After the system 10 performs the table recognition and extraction, the resulting recognized table is displayed to a user (using the user interface module 22) for validation. In some embodiments, the resulting recognized table is illustrated as a header row with associated data fields populated based on the data extracted from the table. An image of the document containing the table is also displayed to the user with the resulting extracted table. Furthermore, the user interface module 22 displays various selection mechanisms (e.g., buttons, etc.) to the user that allow the user to update, approve, and/or submit validated data field associated with a recognized table.

Figure 24:
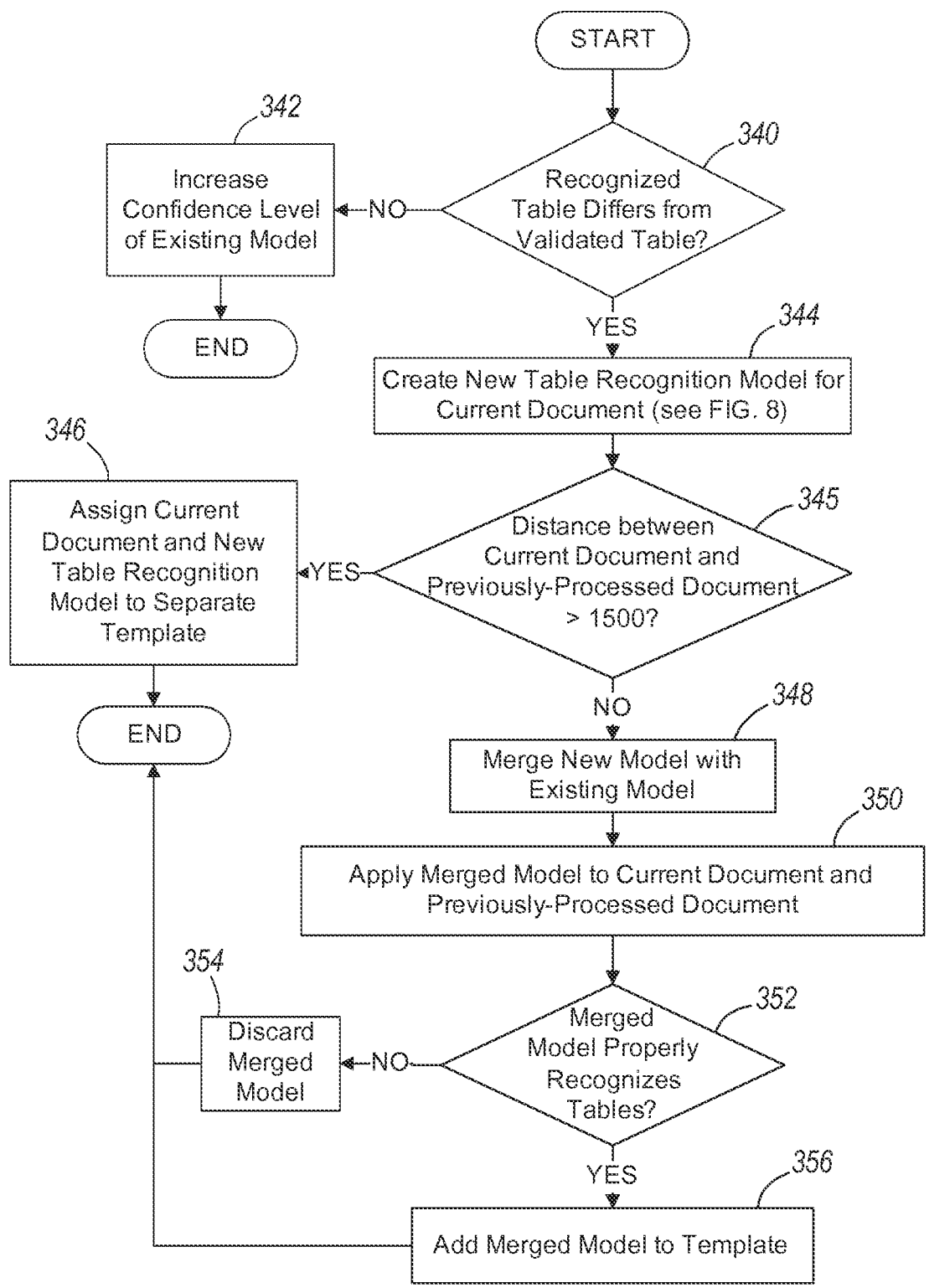
FIG. 24 is a flow chart illustrating a method of improving a table recognition model performed by the system of FIG. 1.

After user validation of data fields populated based on an existing table recognition model, the AL module 23 performs an automatic learning process as illustrated in FIG. 24. In particular, the AL module 23 determines if the table recognized by the existing table recognition model differs from the table validated by the user (e.g., if the user modifies one or more of the table data fields) (at 340). If the recognized table did not differ from the validated table, the table recognition model properly recognizing tables and the AL module 23 updates the confidence level of the recognition model (e.g., add "1" to the level) (at 342).

However, if the user modified the table data fields during the validation process, the system 10 creates a new table recognition model for the current document using the process described above with respect to FIG. 11 (at 344). After creating a new model, the AL module 23 determines if the distance (e.g., differences) between the current document and the document used to create the existing model is great (e.g., >1500) (at 345). If so, the AL module 23 no longer considers the current document to be similar in format as the document used to create the existing model and assigns the new table recognition model to a template associated with the current document (at 346).

Alternatively, if the distance between the current document and the document used to create the existing model is not great (e.g., <=1500) (at 345), the system 10 merges the new table recognition model with the existing model (at 348). The merged table model includes a landmark representing the starting position of the table that is set to the landmark of either the new model or the existing model depending on which landmark has a higher confidence level. The merged table also includes all columns not already included in the existing model. In addition, the merged table includes any interchangeable columns in the existing model and the interchangeable columns are changed to unique columns if the same columns are not also marked interchangeable in the new model. For each column included in both the existing model and the new model, the merged model will include the column associated with the best or higher confidence between the existing model and the new model. As described above, each column is assigned a confidence level based on the arrangement of cells in the column and the exactness of data in the column. Also, for each column, only common data formats for each column are preserved in the merged model. In some embodiments, the existing model and the new model include all possible data formats for each column. Furthermore, the footer for the merged table is set based on the footer having the higher confidence between the existing model and the new model.

After merging the models, the system tests the effectiveness of the merged models by applying the merged model to the current document and a previously-processed document (e.g., the most-recently-processed document using the existing table recognition model) (at 350). If the merged model does not correctly recognize the tables in the two documents (at 352), the system 10 discards or abandons the merged model and only the existing model is retained (at 354). Alternatively, if the merged model correctly recognizes the tables in these two documents, the system 10 retains the merged table along with the existing model (at 356). Therefore, the system 10 creates multiple table recognition models over time associated with the same template. Each time a new document is submitted to the system that is associated with the template, the system 10 extracts the table form the new document using the table recognition model associated with the highest confidence level. Accordingly, over time, the system 10 creates better models while still retaining old models that may still be relevant.

In addition, each time a table recognition model is used to recognize a table in a document, the confidence level associated with the model is updated. For example, the system 10 increases the confidence level (e.g., add "1" to the level") each time the model properly recognizes a table and decreases the confidence level (e.g., divide the level by 2) if the model does not recognize the table or badly recognizes the table (e.g., requires the user to modify two or more of the table data fields). Again, the system 10 uses the table recognition model with the highest confidence level for each inbound document.

Therefore, the table recognition models represent rules similar to the FERs that link values for table data fields to particular data extracted from a document. The system automatically develops and improves these links over time based on user business-as-usual validations.

b. Indirectly-Linked Data or "SmartData" and "SmartColumns"

As noted above, the method 40 illustrated in FIG. 3 can be applied to populate data fields with values that are not directly represented in extracted data and system can apply this functionality to table data (as compared to global data). In some embodiments, the system 10 uses a tracking table as described above to create rules for populating "smartdata" data fields included in a table. The tracking table serves as a look-up table that the system 10 uses to determine a value for the "smartdata" data field. For example, FIG. 25 illustrates an example table 400 included in a document (e.g., a purchase order) processed by the system 10 that includes "smartdata." The columns of interest in the table (i.e., the columns where the system 10 needs to populate data fields based on extracted data) are the columns "Line #," "Order Qty," "Vendor Catalog #," "Price," and "Ext. Price." In addition, the system 10 needs to populate data fields for a "Material ID" column, which is not directly represented in the table but depends on the context contained in the table. Therefore, the "Material ID" column is considered a "smartcolumn" and the value of the data field associated with each row of the column is considered "smartdata."

When the document containing the table 400 illustrated in FIG. 25 is the first submitted to the system 10, the system 10 applies a table recognition model to extract the table data (or create one based on validated table data as described above in Section II). In some embodiments, each "smartcolumn" identified in the table recognition model is associated with a tracking table as described above in Section I. Initially, the system 10 may not be preprogrammed with any tracking tables for "smartcolumns." Therefore, if the table 400 illustrated in FIG. 25 is the first document processed by the system, the system 10 does not have a tracking table to use to populate the "smartdata" data field. Therefore, the user validates this "smartdata" data field 402 during user validation by providing a value for each row of the table 400 (see FIG. 26).

After receiving a value for a "smartdata" data field 402, the AL module creates a tracking table 404 for the data field. The tracking table 404 is similar to the tracking table 110 described above in Section I. The AL module 23 adds a record to the tracking table 404 for each extracted word from the row paired with the value of the "Material ID" data field entered by the user (i.e., "407688700") (see FIG. 27). It should be understood that a "smartdata" data field associated with global data is based on all words on the page or document, and a "smartdata" data field of a "smartcolumn" is based on all words inside of the row that contains the "smartdata" data field.

Figure 28:
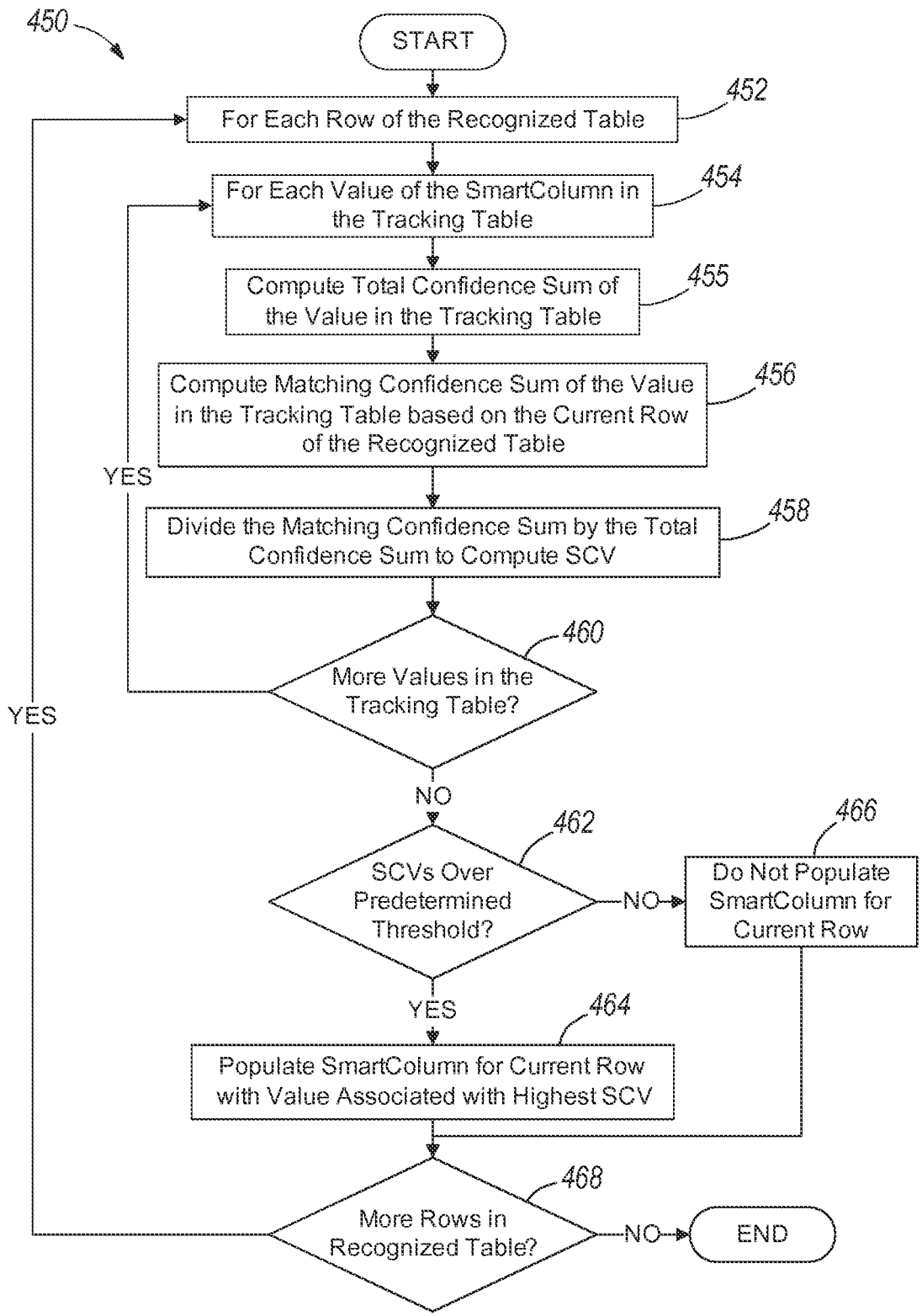
FIG. 28 is a flow chart illustrating a method of populating a "smartdata" data field as performed by the system of FIG. 1.

When the system 10 receives a second document to process with a similar layout, the system 10 applies the table recognition model to extract the table data from the document and uses the tracking table 404 (see FIG. 27) to populate the "Material ID" "smartcolumn" for each row of the recognized table. For example, FIG. 28 illustrates a method 450 performed by the system 10 (e.g., the AL module 23) to populate a "smartcolumn." As illustrated in FIG. 28, for each row of the recognized table (at 452), the system 10 computes a "smartdata" confidence value ("SCV") based on the tracking table. In particular, for a current row of the recognized table 410, the system 10 computes a SCV for each different "Material ID" value included in the tracking table 404 (at 454). For each "Material ID" value, the system 10 identifies the number of records associated with that value and adds the confidence levels of that set of records to determine a total confidence sum (at 455). The system 10 also identifies the number of words included in that set of records that also appear in the current row of the recognized table (i.e., "matching records") and adds the confidence levels of these matching records to determine a matching confidence sum (at 456). The system 10 then divides the matching sum by the total sum to get a SCV for that "Material ID" value (at 458). In some embodiments, to be considered a potential "Material ID" value, the value must have a SCV that is greater than a predetermined threshold (e.g., approximately 45%). Therefore, after the system 10 computes the SCV for each "Material ID" value included in the tracking table (at 460), the system 10 determines if any of the SCVs are greater than the predetermined threshold (at 462). Of those SCVs greater than the predetermined threshold, the system 10 selects the value associated with the highest SCV and populates the "Material ID" data field for the current row with the selected value (at 464). If none of the SCVs are greater than the predetermined threshold (at 462), the system 10 does not populate the "Material ID" data field for the current row (at 466). The system 10 repeats this process for each row of a recognized table (at 468).

For example, in the context of the recognized table 410 illustrated in FIG. 28, the system 10 computes a SCV for each "Material ID" value included in the tracking table 404 for each row of the recognized table 410. As illustrated in FIG. 27, the tracking table 404 includes one "Material ID" value of "407688700." There are 18 records associated with this value that each has a confidence level of "1." Therefore, the total confidence sum for this "Material ID" value is 18. Similarly, for the first row of the recognized table illustrated in FIG. 29, there are 16 records contained in the tracking table that include a word also found in the first row ("matching records") and each of these 16 matching records has a confidence level of "1." Therefore, the matching confidence sum for this "Material ID" value is 16. Accordingly, for the first row of the recognized table 410, the SCV for the "Material ID" value of "407688700" is approximately 89%. This SCV is greater than the example predetermined threshold provided above. Therefore, as illustrated in FIG. 30, the system 10 populates the "Material ID" data field 402 for the first row with the value "407688700."

For the second row of the recognized table 410 of FIG. 29, the total confidence sum is still 18 but the matching confidence sum is only 6. Therefore, the SCV for the "Material ID" value of "407688700" for the second row of the recognized table is only approximately 33%, which is less than the predetermined threshold. Accordingly, as illustrated in FIG. 30, the system 10 does not populate the "Material ID" data field 402 with this value in the second row of the recognized table. Accordingly, during user validation, the user provides a value for the "Material ID" data field for the second row that the system 10 was unable to populate (see FIG. 31, with value "MAXFAST" specified for the "Material ID" data field 402 for the second row).

After user validation, the system 10 performs automatic learning and updates the table recognition model as described above in Section II. The system 10 also updates the tracking table 404. In particular, for each row of the recognized table where the system 10 properly populated a value for the "smartcolumn," the system 10 increases the confidence level (e.g., add "1" to the level) of each record in the table that contributed to the population of that field. Similarly, the system 10 decreases the confidence level (e.g., subtract "1" from the level) of each record in the table that did not contribute to the data field population. For example, for the first row of the recognized table 410 illustrated in FIG. 29, the system 10 increases the confidence level of the 16 matching records. Also, for the first row of the recognized table illustrated in FIG. 29, the system 10 decreases the confidence level of the remaining two records of the 18 records that contained a word that did not match a word contained in the first row.

As part of updating the tracking table, the system also adds each new word extracted from the first row to the table and assigns the record an initial confidence level of 1. FIG. 32 illustrates the tracking table 404 as updated by the system 10 for the first row of the recognized table 410.

In addition, for each row of the recognized table 410 where system 10 was unable to properly populate a value for the "Material ID" "smartcolumn," the system 10 adds a new record to the tracking table 404. Each new record includes a word extracted from the row, the value of the "Material ID" "smartcolumn" for the row as provided by the user, and an initial confidence level of "1." For example, FIG. 33 illustrates the tracking table 404 as updated by the system 10 for the second row of the recognized table 410.

FIG. 34 illustrates a third document submitted to the system 10 for processing. When the system 10 receives the third document, the system 10 applies the table recognition model to recognize and extract the table 414 from the document. The system 10 also applies the tracking table to populate the "Material ID" "smartcolumn" 402 for the table 414. For example, as described above with respect to FIG. 28, the system 10 creates a SCV for each value included in the tracking table 404 for each row of the table 414. As shown in FIGS. 32 and 33, the tracking table 404 (as updated after processing the second document) includes two potential "Material ID" values (i.e., "407688700" and "MAXFAST"). Therefore, the system 10 determines a SCV for each of these values for each row of the recognized table 414 to identify if any of the SCVs exceed the predetermined threshold.

For the first row of the recognized table 414, the SCV for the value "407688700" is approximately 30% (5 matching records with a matching confidence sum of "10" divided by 20 records for the value "407688700" with a total confidence sum of "33"), and the SCV for the value "MAXFAST" is approximately 89% (16 matching records with a matching confidence sum of "16" divided by 18 records for the value "MAXFAST" with a total confidence sum of "18"). Therefore, for the first row of the recognized table 414, the value "MAXFAST" has a SCV greater than the predetermined value. Accordingly, as illustrated in FIG. 35, the system 10 populates the "Material ID" data field in the first row with the value "MAXFAST." It should be understood that if the SCV associated with the value "407688700" was also greater than the predetermined threshold, the system 10 would select the value associated with the highest SCV.

For the second row of the recognized table 414, the SCV for the value "407688700" is approximately 85% (14 matching records with a matching confidence sum of "28" divided by 20 records for the value "407688700" with a total confidence sum of "33"), and the SCV for the value "MAXFAST" is approximately 28% (5 matching records with a matching confidence sum of "5" divided by 18 records for the value "MAXFAST" with a total confidence sum of "18"). Therefore, for the second row, the value "407688700" has a SCV greater than the predetermined value. Accordingly, as illustrated in FIG. 35, the system 10 populates the "Material ID" data field in the second row with the value "407688700." Again, it should be understood that if the SCV associated with the value "MAXFAST" was also greater than the predetermined threshold, the system 10 would select the value associated with the highest SCV.

Accordingly, as shown in the above examples, the system 10 automatically "learns" links between data extracted from documents and data fields. The system 10 uses these learned links to establish rules (e.g., FERs, tracking tables, table recognition models, etc.) that define how to automatically populate the data fields for subsequently-processed documents. In particular, by tracking user business-as-usual validations and comparing such validations to extracted data, the system 10 is able to automatically build rules that link extracted data and particular data fields, which eliminate or at least reduce the need for manual entry of data field values. The rules are used to populate data fields with constant values, directly-linked data, and indirectly-linked data. The rules are also used to recognize and extract data structured as tables. In addition, the rules automatically evolve over time to account for changes to documents without requiring the entire system 10 to be re-programmed or re-configured.

Various features and advantages of the invention are set forth in the following claims.

What is claimed is:

1. A computer-implemented method for transforming at least a portion of a physical document to digital data, the method comprising:
   receiving, with a processor, a template including a plurality of data fields;
   creating, with the processor and for the template, one or more rules that define what data items to extract from which physical positions in a physical document and a format in which to present the data in one or more of the plurality of data fields;
   storing, with the processor, the template, the one or more rules, and the format in a template table;
   obtaining, with the processor, a first plurality of data items automatically extracted from a first physical document according to the template;
   populating, with the processor, a data field of the plurality of data fields with a data item from the first plurality of data items after the first plurality of data items is automatically extracted from the first physical document;
   obtaining, with the processor, a validated value for the data field in response to a user input and after the data field is populated with the data item, the validated value being different than the data item initially populated in the data field and not directly represented in the first plurality of data items;
   updating, with the processor, a rule of the one or more rules stored in the template table based on the validated value, the rule defining the physical position in the physical document at which to extract the validated value;
   automatically, with the processor, identifying a first linked data item included in the first plurality of data items, the first linked data item corresponding to the data item initially populated in the data field;
   linking the first linked data item to the validated value for the data field obtained in response to the user input;
   automatically, with the processor, setting a physical position included in a second rule of the one or more rules associated with the template, the second rule defining how to populate a value for the data field to the physical position of the first linked data item within the first physical document;
   obtaining, with the processor, a second plurality of data items automatically extracted from a second physical document according to the template;
   automatically, with the processor, identifying, using the template, a candidate data item included in the second plurality of data items based on the second rule, the candidate data item located at a physical position within the second physical document matching the physical position included in the second rule; and
   automatically, with the processor, populating the data field for the second physical document with the validated value based on the candidate data item, the validated value being different than the candidate data item.

2. The method of claim 1, further comprising obtaining a second validated value for the data field, the second validated value associated with the second physical document and including at least one of (i) the value of the data field populated based on the candidate data item and (ii) a modified value.

3. The method of claim 2, further comprising increasing a confidence level of the second rule when the second validated value includes the value of the data field populated based on the candidate data item.

4. The method of claim 3, further comprising decreasing the confidence level of the second rule when the second validated value includes the modified value.

5. The method of claim 4, further comprising deleting the second rule when the confidence level of the rule falls below a predetermined threshold.

6. The method of claim 2, further comprising:
   automatically, with the processor, identifying a second linked data item included in the second plurality of data items;
   linking the second linked data item to the second validated value for the data field in response to the second user input; and
   automatically, with the processor, setting the physical position included in the second rule to the physical position of the second linked data item within the second physical document.

7. The method of claim 6, wherein identifying the first linked data item includes:
  creating a plurality of records, each of the plurality of records including one of the first plurality of data items, a physical position of the one data item within the first physical document, the validated value, and a confidence level; and
  identifying a highest confidence record included in the plurality of records, the highest confidence record including the first linked data item and having a highest confidence level among the plurality of records.

8. The method of claim 7, wherein populating the value for the data field for the second physical document includes:
  identifying at least one matching record included in the plurality of records, the at least one matching record including the candidate data item; and
  setting the value of the data field to the validated value included in the at least one matching record having the highest confidence level.

9. The method of claim 8, wherein identifying the second linked data item includes updating the plurality of records based on the second validated value and the second plurality of data items, wherein updating the plurality of records includes at least one of (i) adding at least one record to the plurality of records, the at least one record including one of the second plurality of data items, a physical position within the second physical document of the one data item, the second validated value, and a confidence level and (ii) updating a confidence level of at least one record included in the plurality of records.

10. The method of claim 9, wherein updating the second rule based on the physical position of the second linked data item includes:
  identifying a highest confidence record included in the plurality of records, the highest confidence record including a highest confidence level among the plurality of records; and
  setting a physical position included in the second rule to a physical position included in the highest confidence record.

11. A computer-implemented method for transforming at least a portion of a physical document to digital data, the method comprising:
  receiving, with a processor, a template including a plurality of data fields;
  creating, with the processor and for the template, one or more rules that define what data items to extract from which physical positions in a physical document and a format in which to present the data in one or more of the plurality of data fields;
  storing, with the processor, the template, the one or more rules, and the format in a template tables;
  obtaining, with the processor, a first plurality of data items automatically extracted from a first physical document according to the template;
  populating, with the processor, a data field of the plurality of data fields with a data item from the first plurality of data items after the first plurality of data items is automatically extracted from the first physical document;
  obtaining, with the processor, a validated value for the data field in response to a user input and after the data field is populated with the data item, the validated value being different than the data item initially populated in the data field and not directly represented in the first plurality of data items;
  updating, with the processor, a rule of the one or more rules stored in the template table based on the validated value, the rule defining the physical position in the physical document at which to extract the validated value;
  automatically, with the processor, identifying a first linked data item included in the first plurality of data items, the first linked data item corresponding to the data item initially populated in the data field;
  linking the first linked data item to the validated value for the data field in response to the user input;
  automatically, with the processor, setting a physical position included in a second rule associated with the template, the second rule defining how to populate a value for the data field to a physical position of the first linked data item within the first physical document;
  obtaining, with the processor, a second plurality of data items automatically extracted from a second physical document according to the template;
  automatically, with the processor, identifying, using the template, a candidate data item included in the second plurality of data items based on the second rule, the candidate data item located at a physical position within the second physical document matching the physical position included in the second rule; and
  automatically, with the processor, setting a value for the data field for the second physical document to the validated value for the data field, the validated value being different than the candidate data item.

12. The method of claim 11, further comprising obtaining a second validated value for the data field in response to a second user input, the second validated value associated with the second physical document and including at least one of (i) the value of the data field populated based on the candidate data item and (ii) a modified value.

13. The method of claim 12, further comprising increasing a confidence level of the second rule when the second validated value includes the value of the data field populated based on the candidate data item.

14. The method of claim 13, further comprising decreasing the confidence level of the second rule when the second validated value includes the modified value.

15. The method of claim 14, further comprising deleting the second rule when the confidence level of the rule falls below a predetermined threshold.

16. A computer-implemented method for transforming at least a portion of a physical document to digital data, the method comprising:
  receiving, with a processor, a template including a plurality of data fields;
  creating, with the processor and for the template, one or more rules that define what data items to extract from which physical positions in a physical document and a format in which to present the data in one or more of the plurality of data fields;
  obtaining, with the processor, a first plurality of data items automatically extracted from a first physical document according to the template;
  populating, with the processor, a data field of the plurality of data fields with a data item from the first plurality of data items after the first plurality of data items is automatically extracted from the first physical document;
  obtaining, with the processor, a validated value for the data field in response to a user input and after the data field is populated with the data item, the validated value being different than the data item initially populated in the data field and not directly represented in the first plurality of data items;

updating, with the processor, a rule of the one or more rules stored in the template table based on the validated value, the rule defining the physical position in the physical document at which to extract the validated value;

automatically, with the processor, creating a plurality of records, each of the plurality of records including one of the first plurality of data items, a physical position of the one data item within the first physical document, the validated value for the data field, and a confidence level;

automatically, with the processor, identifying a highest confidence record included in the plurality of records, the highest confidence record having a highest confidence level among the plurality of records;

automatically, with the processor, setting a physical position included in a second rule of the one or more rules, the second rule defining how to populate a value for the data field to a physical position included in the highest confidence record and the second rule associated with the template;

obtaining, with the processor, a second plurality of data items automatically extracted from a second physical document according to the template;

automatically, with the processor, identifying, using the template, a candidate data item included in the second plurality of data items, the candidate data item located at a physical position within the second physical document matching the physical position included in the second rule;

automatically, with the processor, identifying at least one matching record included in the plurality of records, the at least one matching record including the candidate data item; and automatically, with the processor, setting a value for the data field for the second physical document to a validated value included in the at least one matching record having the highest confidence level, the validated value included in the at least one matching record being different than the candidate data item.

17. The method of claim 16, further comprising obtaining a second validated value for the data field in response to a second user input, the second validated value associated with the second physical document and including at least one of (i) the validated value included in the at least one matching recording having the highest confidence level and (ii) a modified value.

18. The method of claim 17, further comprising increasing a confidence level of the second rule when the second validated value includes the validated value included in the at least one matching recording having the highest confidence level.

19. The method of claim 18, further comprising decreasing the confidence level of the second rule when the second validated value includes the modified value.

20. The method of claim 19, further comprising deleting the second rule when the confidence level of the rule falls below a predetermined threshold.

21. A system for transforming at least a portion of a physical document into digital data, the system comprising:
non-transitory computer-readable media storing instructions; and
a processor configured to retrieve the instructions from the computer-readable media and execute the instructions to transform a physical document into digital data, wherein the instructions define:
a capturing module configured to extract a plurality of data items from a physical document according to a template, the template including a plurality of data fields;
an automatic learning module configured to
generate a rule associated with the template, the rule defining what data items to extract from which physical positions in a physical document and a format in which to present the data in one or more of the plurality of data field, the rule including a physical position,
apply the rule to a first physical document submitted to the system to identify a candidate data item from the plurality of data items located at the physical position within the first physical document, and
populate a value for a data field of the plurality of data fields, the data field being associated with the first physical document based on the candidate data item; and
a user interface module configured to display the value for the data field populated by the automatic learning module to a user and receive a validated value in response to a user input and after the data field is populated based on the candidate data item, wherein the validated value includes a modified value, the modified value being different than the populated value for the data field based on the candidate data item and not directly represented in the first plurality of data items,
wherein the automatic learning module is further configured to update the rule based on the validated value,
wherein updating the rule includes updating the physical position in the physical document at which to extract the validated value.

22. The system of claim 21, wherein the automatic learning module is further configured to increase a confidence level associated with the rule when the validated value includes the value for the data field populated by the automatic learning module.

23. The system of claim 22, wherein the automatic learning module is further configured to decrease a confidence level associated with the rule when the validated value includes the modified value.

24. The system of claim 23, wherein the automatic learning module is further configured to discard the rule when the confidence level falls below a predetermined threshold.

* * * * *